US012598457B2

(12) United States Patent
Ma

(10) Patent No.: US 12,598,457 B2
(45) Date of Patent: Apr. 7, 2026

(54) METHOD FOR PROTECTING PRIVACY OF GROUP MEMBER IN GROUP AND TERMINAL DEVICE

(71) Applicant: HUAWEI TECHNOLOGIES CO., LTD., Shenzhen (CN)

(72) Inventor: Zhiwei Ma, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 351 days.

(21) Appl. No.: 18/249,734

(22) PCT Filed: Oct. 22, 2021

(86) PCT No.: PCT/CN2021/125531
§ 371 (c)(1),
(2) Date: Apr. 19, 2023

(87) PCT Pub. No.: WO2022/083721
PCT Pub. Date: Apr. 28, 2022

(65) Prior Publication Data
US 2023/0388782 A1 Nov. 30, 2023

(30) Foreign Application Priority Data

Oct. 22, 2020 (CN) .......................... 202011142021.9
Dec. 25, 2020 (CN) .......................... 202011565926.7

(51) Int. Cl.
*H04W 12/02* (2009.01)
*G06F 21/84* (2013.01)
(52) U.S. Cl.
CPC ............ *H04W 12/02* (2013.01); *G06F 21/84* (2013.01)

(58) Field of Classification Search
CPC ...... H04W 12/02; G06F 21/84; G06F 21/606; G06F 21/6245; H04L 51/04; H04L 51/48;
(Continued)

(56) References Cited

U.S. PATENT DOCUMENTS 10,558,673 B2 * 2/2020 Lee .......................... H04L 51/52
2009/0157732 A1 * 6/2009 Hao ................... H04M 3/53325
707/999.102
(Continued)

FOREIGN PATENT DOCUMENTS

CN 104270506 A 1/2015
CN 104301490 A 1/2015
(Continued)

OTHER PUBLICATIONS

Translation of WO-2018227752-A1 (Year: 2018).*
(Continued)

*Primary Examiner* — George Eng

(57) ABSTRACT

A terminal device displays a group member list of a group in an instant messaging application; the terminal device displays a first phone number of the first group member; the terminal device displays a profile picture and/or a user name of the second group member, and a control used for adding a contact; the terminal device sends a first request to a cloud server in response to a third operation for the contact adding control, where the first request is used for requesting to add the second group member as a contact; the cloud server sends a second phone number of the second group member to the terminal device; and the terminal device saves the second group member as a contact.

19 Claims, 28 Drawing Sheets

(58) Field of Classification Search
CPC . H04L 63/104; H04L 63/0421; H04L 12/185;
H04L 12/1822; H04L 51/046; H04M
1/27475; H04M 1/7243; H04M 1/27457;
H04M 1/2757
See application file for complete search history.

(56) References Cited

U.S. PATENT DOCUMENTS

| | | | | |
|---|---|---|---|---|
| 2010/0091763 A1* | 4/2010 | Thompson | ............ | H04L 9/0866 |
| | | | | 379/142.04 |
| 2012/0311052 A1 | 12/2012 | Lee et al. | | |
| 2014/0011487 A1 | 1/2014 | Hwang et al. | | |
| 2016/0381035 A1* | 12/2016 | Wu | ..................... | G06F 21/6218 |
| | | | | 726/4 |
| 2019/0018848 A1 | 1/2019 | Lee | | |

FOREIGN PATENT DOCUMENTS

| | | | | |
|---|---|---|---|---|
| CN | 106789568 A | 5/2017 | | |
| CN | 107147505 A | 9/2017 | | |
| CN | 107196846 A | 9/2017 | | |
| CN | 110971757 A | 4/2020 | | |
| WO | WO-2018227785 A1 * | 12/2018 | ............. | H04L 65/40 |

OTHER PUBLICATIONS

Liu Zeping, Design and Implementation of Mobile Phone Privacy
Security Based on Android System, Communication Design and
Application, Dec. 2017, 3 pages.

* cited by examiner

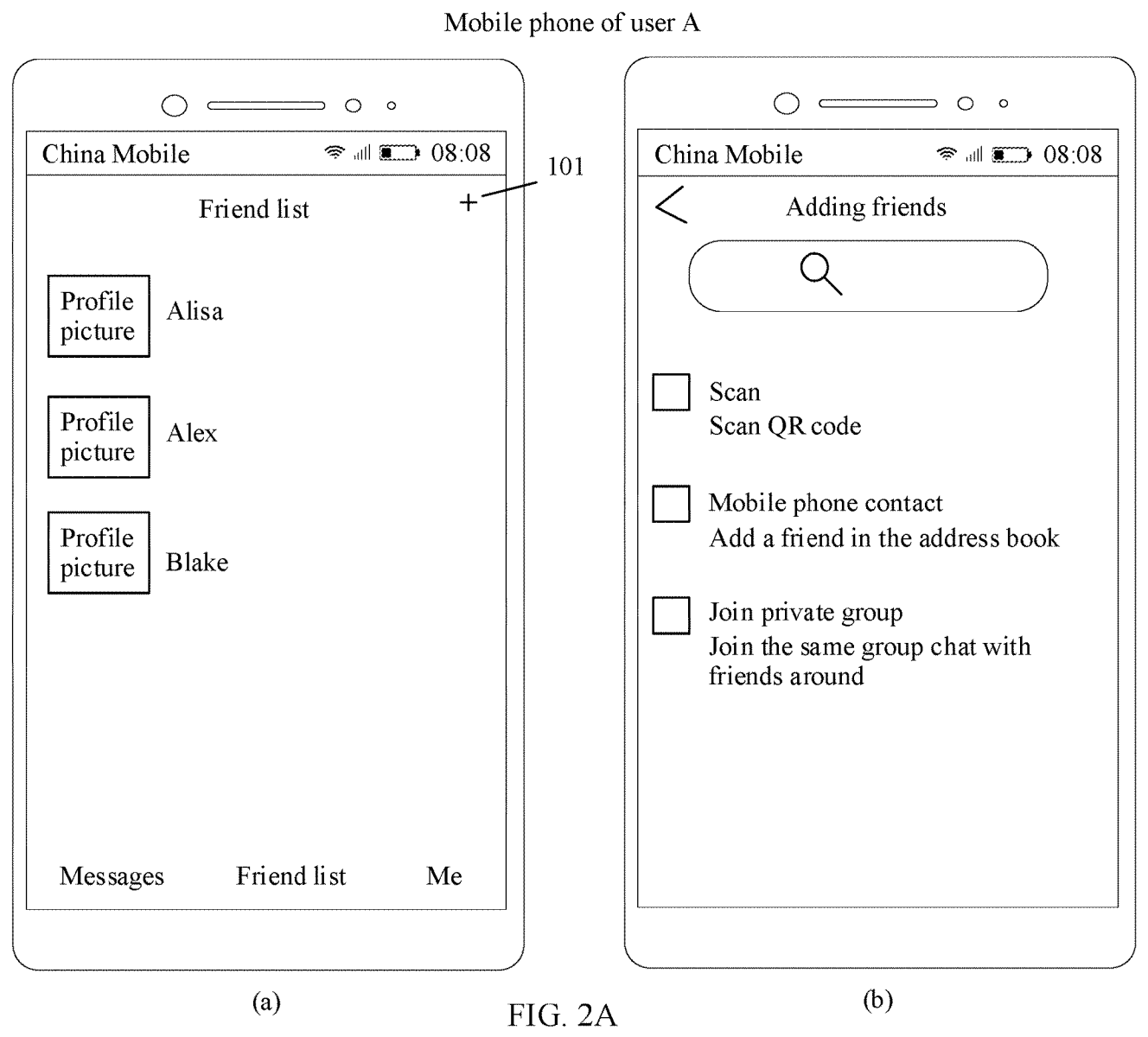

Mobile phone of user A

China Mobile    08:08

Friend list    + 101

Profile picture    Alisa

Profile picture    Alex

Profile picture    Blake

Messages    Friend list    Me (a)

China Mobile    08:08

Adding friends

Scan
Scan QR code

Mobile phone contact
Add a friend in the address book

Join private group
Join the same group chat with friends around (b)

FIG. 2A

Mobile phone of user A (a)

Figure 5B:
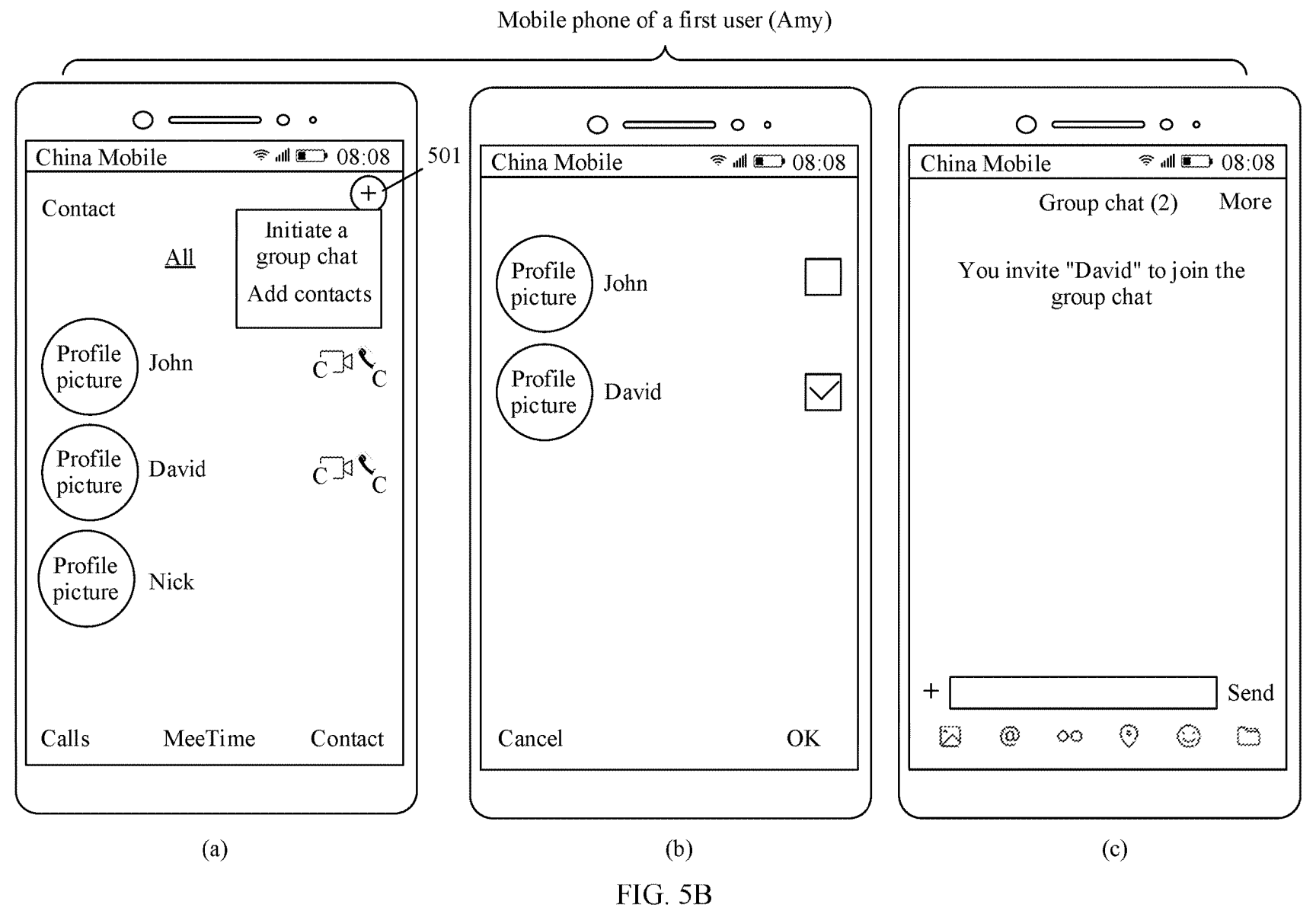

Mobile phone of a first user (Amy)

China Mobile

Contact

All

Profile picture   John

Profile picture   David

Profile picture   Nick

Calls    MeeTime    Contact

501

Initiate a group chat
Add contacts (a)

China Mobile

Profile picture   John

Profile picture   David

Cancel                OK (b)

China Mobile    Group chat (2)    More

You invite "David" to join the group chat

Send

Mobile phone of a second user (David)

Mobile phone of a first user (Amy)

Mobile phone of a first user (Amy)

Mobile phone of a first user (Amy)

Mobile phone of a first user (Amy)

900

903

METHOD FOR PROTECTING PRIVACY OF GROUP MEMBER IN GROUP AND TERMINAL DEVICE

CROSS-REFERENCE TO RELATED APPLICATIONS

This application is a National Stage of International Application No. PCT/CN2021/125531, filed on Oct. 22, 2021, which claims priority to Chinese Patent Application No. 202011142021.9, filed on Oct. 22, 2020, and Chinese Patent Application No. 202011565926.7, filed on Dec. 25, 2020, all of which are hereby incorporated by reference in their entireties.

TECHNICAL FIELD

This application relates to the field of terminal technologies, and in particular, to a method for protecting privacy of a group member in a group and a terminal device.

BACKGROUND

With the development of communications technologies, functions of an instant messaging (instant messaging, IM) application become more diversified, and not only video/voice calls or message sending and receiving between users can be implemented, but also a group can be established.

Generally, a group member in a group can invite a friend to the group. However, the friend may be a stranger to other group members in the group. If privacy information (such as a mobile phone number) of a group member is displayed in plaintext, the privacy information of the group member may be exposed to strangers in the group. Therefore, how to protect privacy information of a group member in a group is a problem that needs to be considered.

SUMMARY

An objective of this application is to provide a method for protecting privacy of a group member in a group and a terminal device, so as to protect privacy information of the group member in the group.

According to a first aspect, a method for protecting privacy of a group member in a group is provided, where the method is applicable to a terminal device. A mobile phone number of the terminal device is a first mobile phone number, the terminal device includes a first address book, the first address book includes a first user, a mobile phone number of the first user is a second mobile phone number, and both the first mobile phone number and the second mobile phone number enable an instant messaging function. The method includes: In response to a first operation, the terminal device establishes a group based on the first mobile phone number and the second mobile phone number; a second user joins the group in response to an operation of adding a group member by the first user, where a mobile phone number of the second user enables the instant messaging function; the terminal device determines, in response to an operation for viewing the information about the second user, whether the first address book includes the second user, and if the first address book does not include the second user, displays a profile picture and a nickname of the second user, where the profile picture and the nickname are a profile picture and a nickname that are used by the second user when the second user enables the instant messaging function by using the phone number of the second user.

That is, when an instant messaging application that performs communication based on a mobile phone number, such as HUAWEI MeeTime or RCS, establishes a group, when group member A in the group views information about group member B, if group member B is not in an address book of group member A, group member A cannot see a mobile phone number of group member B, so as to protect the mobile phone number of the group member from being exposed. For description of the instant messaging application that performs communication based on a mobile phone number, refer to a specific embodiment part of this specification.

In a possible design, that the terminal device determines whether the first address book includes the second user includes: The terminal device sends the first address book to a cloud server, where the cloud server is a server that provides an instant messaging function for the user, and the cloud server stores mobile phone numbers of all users who have enabled the instant messaging function;

the terminal device sends a query request to the cloud server, where the query request is used for requesting to query whether the mobile phone number of the second user exists in the first address book; and the terminal device receives a first indication from the cloud server, and determines, based on the first indication, that the mobile phone number of the second user does not exist in the first address book.

That is, when group member A in the group views the information about group member B, group member A may check, through the cloud server, whether the mobile phone number of group member B exists in the address book of group member A. If yes, group member A can see the mobile phone number of group member B; otherwise, group member A cannot see the mobile phone number of group member B.

In a possible design, the method further includes: in response to an operation of adding the second user to the first address book, determining whether a call record of the terminal device includes the mobile phone number of the second user; and if yes, saving the phone number of the second user in the call record to the first address book.

That is, when group member A in the group views the information about group member B, if group member B is not in an address book of group member A, group member A cannot view the mobile phone number of group member B. Therefore, if group member A wants to chat with group member B alone, group member A may add group member B as a contact. For example, group member A can query whether the mobile phone number of group member B exists in a call record. If yes, it indicates that group member A has contacted group member B, but the mobile phone number of group member B is not saved in the address book. In this case, the mobile phone number of group member B may be directly added to the address book of group member A.

In a possible design, the determining whether a call record of the terminal device includes the mobile phone number of the second user includes: The terminal device sends the call record to a cloud server, where the cloud server is a server that provides the instant messaging function for a user, and the cloud server stores the phone number of the second user; the cloud server is used to determine whether the phone number of the second user exists in the call record; and when receiving a confirmation instruction sent by the cloud server, the terminal device determines that the call record of the terminal device includes the mobile phone number of the second user.

In other words, group member A may determine, by using the cloud server, whether the mobile phone number of group member B exists in a communication record of group member B. In this way, the mobile phone number of group member B is not exposed to group member A, which ensures high security.

In a possible design, the method further includes: In response to an operation of adding the second user to the first address book, the terminal device determines whether a second address book of the second user includes the first mobile phone number; and if yes, obtains the mobile phone number of the second user from the cloud server, and stores the mobile phone number of the second user in the first address book, where the cloud server is a server that provides an instant messaging function for the user, and the cloud server stores mobile phone numbers of users who have enabled the instant messaging function.

That is, when group member A in the group views the information about group member B, if group member B is not in the address book of group member A, group member A cannot view the mobile phone number of group member B. Therefore, if group member A wants to chat with group member B alone, group member A may add group member B as a contact. For example, group member A can query whether the mobile phone number of group member A exists in the address book of group member B. If yes, group member B has saved group member A to the address book. In this case, group member A can directly add the mobile phone number of group member B to the address book of group member A.

In a possible design, the cloud server further stores the second address book of the second user, and that the terminal device determines whether a second address book of the second user includes the first mobile phone number includes: The terminal device sends a query request to the cloud server, where the query request is used to query whether the first mobile phone number exists in the second address book of the second user; and when receiving a confirmation instruction from the cloud server, the terminal device determines that the first mobile phone number exists in the second address book.

In other words, group member A may determine, by using the cloud server, whether the mobile phone number of group member A exists in the address book of group member B. In this way, the mobile phone number of group member B can be prevented from being exposed to group member A, which ensures high security.

According to a second aspect, a method for protecting privacy of a group member in a group is provided. The method is applicable to a cloud server, the cloud server provides an instant messaging function for a user, the cloud server stores a first user and a second user who enable the instant messaging function based on a mobile phone number, a phone number of the first user is a first phone number, a phone number of the second user is a second phone number, the cloud server further includes a first address book of the first user, and the first address book includes a second mobile phone number of the second user. The method includes: receiving a first request of the first user, where the first request is used for requesting to create a group including the first user and the second user; in response to the first request, creating, by the cloud server, a group based on the first mobile phone number and the second mobile phone number; and in response to a second request of the second user, adding a third user to the group, where the third user has enabled the instant messaging function based on a third mobile phone number; when it is determined that the third mobile phone number does not exist in the first address book, sending, by the cloud server, a profile picture and a nickname of the third user to the first user, where the nickname and the profile picture are a profile picture and a nickname that are used by the third user when the third user enables the instant messaging function by using the third mobile phone number.

That is, when an instant messaging application that performs communication based on a mobile phone number, such as HUAWEI MeeTime or RCS, establishes a group, if group member B is not in an address book of group member A, the cloud server may not send the mobile phone number of group member B to group member B, so as to protect the mobile phone number of the group member from being exposed.

In a possible design, the method further includes: receiving a call record of the first user sent by the first user, where the call record includes a mobile phone number of a user who has a call with the first user; and in response to an adding request from the first user, where the adding request is used for adding the third user to the first address book of the first user, determining, by the cloud server, whether the first call record includes the third mobile phone number of the third user; and when it is determined that the call record of the first user includes the third mobile phone number, sending the third mobile phone number to the first user, so that the first user saves the third mobile phone number into the first address book.

That is, if group member B is not in the address book of group member A, group member A cannot view the mobile phone number of group member B. Therefore, if group member A wants to chat with group member B, group member A may add group member B as a contact. For example, the cloud server may query whether a mobile phone number of group member B exists in a call record of group member A. If yes, it indicates that group member A has contacted group member B, but the mobile phone number of group member B is not saved in the address book. In this case, the mobile phone number of group member B may be sent to group member A.

In a possible design, the method further includes: when it is determined that the call record of the first user does not include the third mobile phone number, sending the adding request to the third user; and after receiving an indication from the third user that the third user agrees adding, sending the third mobile phone number to the first user, so that the first user saves the third mobile phone number in the first address book.

That is, when it is determined that the call record of group member A does not include the mobile phone number of group member B, before sending the mobile phone number of group member B to group member A, the cloud server may further query whether group member B agrees to provide the mobile phone number of group member B to group member A, and send the mobile phone number of group member B to group member A if group member B agrees.

In a possible design, the method further includes: receiving a third address book of the third user, where the third address book includes a phone number of a contact saved by the third user; in response to the adding request from the first user, where the adding request is used for adding the third user to the first address book of the first user, determining, by the cloud server, whether the third address book includes the first mobile phone number of the first user; and when it is determined that the third address book includes the first mobile phone number, sending the third mobile phone number to the first user, so that the first user saves the third mobile phone number into the first address book.

That is, if group member B is not in the address book of group member A, group member A cannot view the mobile phone number of group member B. Therefore, if group member A wants to chat with group member B, group member A may add group member B as a contact. For example, the cloud server may query whether a mobile phone number of group member A exists in an address book of group member B, and if yes, the cloud server may send the mobile phone number of group member B to group member A.

In a possible design, the method further includes: when it is determined that the third address book does not include the first mobile phone number, sending the adding request to the third user; and after receiving an indication from the third user that the third user agrees adding, sending the third mobile phone number to the first user, so that the first user saves the third mobile phone number in the first address book.

That is, when it is determined that the address book of group member B does not include the mobile phone number of group member A, before sending the mobile phone number of group member B to group member A, the cloud server may further query whether group member B agrees to provide the mobile phone number of group member B to group member A, and send the mobile phone number of group member B to group member A if group member B agrees.

According to a third aspect, a terminal device is further provided, where a mobile phone number of the terminal device is a first mobile phone number, the terminal device includes a first address book, the first address book includes a first user, a mobile phone number of the first user is a second mobile phone number, and both the first mobile phone number and the second mobile phone number have enabled an instant messaging function; and the terminal device includes:

one or more processors; and one or more memories, where the one or more memories store one or more computer programs, the one or more computer programs include instructions, and when the instructions are executed by the one or more processors, the first electronic device is enabled to perform the following steps:

in response to a first operation, establishing, by the terminal device, a group based on the first mobile phone number and the second mobile phone number, where a second user joins the group in response to an operation of adding a group member by the first user, and an instant messaging function for a mobile phone number of the second user is enabled; and determining, by the terminal device in response to an operation for viewing information about the second user, whether the first address book includes the second user, and if the first address book does not include the second user, displaying a profile picture and a nickname of the second user, where the profile picture and the nickname are a profile picture and a nickname that are used by the second user when the second user enables the instant messaging function by using the phone number of the second user.

In a possible design, when the instructions are executed by the one or more processors, the first electronic device is enabled to specifically perform the following steps:

sending the first address book to a cloud server, where the cloud server is a server that provides the instant messaging function for a user, and the cloud server stores mobile phone numbers of all users who have enabled the instant messaging function;

sending a query request to the cloud server, where the query request is used for requesting to query whether the mobile phone number of the second user exists in the first address book; and receiving a first indication from the cloud server, and determining, based on the first indication, that the mobile phone number of the second user does not exist in the first address book.

In a possible design, when the instructions are executed by the one or more processors, the first electronic device is enabled to further perform the following steps:

in response to an operation of adding the second user to the first address book, determining whether a call record of the terminal device includes the mobile phone number of the second user, and if yes, saving the phone number of the second user in the call record into the first address book.

In a possible design, when the instructions are executed by the one or more processors, the first electronic device is enabled to specifically perform the following steps:

sending the call record to a cloud server, where the cloud server is a server that provides the instant messaging function for a user, the cloud server stores a phone number of the second user, and the cloud server is configured to determine whether the phone number of the second user exists in the call record; and when a confirmation instruction sent by the cloud server is received, determining that the call record of the terminal device includes the mobile phone number of the second user.

In a possible design, when the instructions are executed by the one or more processors, the first electronic device is enabled to further perform the following steps:

in response to an operation of adding the second user to the first address book, determining, by the terminal device, whether the second address book of the second user includes the first mobile phone number, and if yes, obtaining the mobile phone number of the second user from a cloud server, and storing the mobile phone number of the second user in the first address book, where the cloud server is a server that provides the instant messaging function for the user, and the cloud server stores a mobile phone number of a user who has enabled the instant messaging function.

In a possible design, the cloud server further stores a second address book of the second user, and when the instructions are executed by the one or more processors, the first electronic device is enabled to specifically perform the following steps:

sending a query request to the cloud server, where the query request is used to query whether the first mobile phone number exists in a second address book of the second user; and when receiving a confirmation instruction from the cloud server, determining that the first phone number exists in the second address book.

According to a fourth aspect, a cloud server is further provided, where the cloud server provides an instant messaging function for a user, the cloud server stores a first user and a second user who enable the instant messaging function based on a mobile phone number, a phone number of the first user is a first phone number, a phone number of the second user is a second phone number, the cloud server further includes a first address book of the first user, the first address book includes the second mobile phone number of the second user, and the cloud server includes:

one or more processors; and one or more memories, where the one or more memories store one or more computer programs, the one or more computer programs include instructions, and when the instructions are executed by the one or more processors, the first electronic device is enabled to perform the following steps:

receiving a first request of the first user, where the first request is used for requesting to create a group including the first user and the second user;

in response to the first request, creating, by the cloud server, a group based on the first mobile phone number and the second mobile phone number;

adding a third user to the group in response to a second request of the second user, where the third user has enabled the instant messaging function based on a third phone number; and when it is determined that the third mobile phone number does not exist in the first address book, sending, by the cloud server, a profile picture and a nickname of the third user to the first user, where the nickname and the profile picture are a profile picture and a nickname that are used by the third user when the third user enables the instant messaging function by using the third mobile phone number.

In a possible design, when the instructions are executed by the one or more processors, the first electronic device is enabled to further perform the following steps:

receiving a call record of the first user sent by the first user, where the call record includes a mobile phone number of a user who has a call with the first user;

in response to an adding request from the first user, where the adding request is used for adding the third user to a first address book of the first user, determining, by the cloud server, whether the first call record includes the third mobile phone number of the third user;

when it is determined that the call record of the first user includes the third mobile phone number, sending the third mobile phone number to the first user, so that the first user saves the third mobile phone number into the first address book.

In a possible design, when the instructions are executed by the one or more processors, the first electronic device is enabled to further perform the following steps:

sending the adding request to the third user when it is determined that the call record of the first user does not include the third mobile phone number; and after receiving an indication that the third user agrees adding, sending the third mobile phone number to the first user, so that the first user saves the third mobile phone number into the first address book.

In a possible design, when the instructions are executed by the one or more processors, the first electronic device is enabled to further perform the following steps:

receiving a third address book of the third user, where the third address book includes a phone number of a contact stored by the third user;

in response to the adding request from the first user, where the adding request is used for adding the third user to the first address book of the first user, determining, by the cloud server, whether the third address book includes the first mobile phone number of the first user; and when it is determined that the third address book includes the first mobile phone number, sending the third mobile phone number to the first user, so that the first user saves the third mobile phone number into the first address book.

In a possible design, when the instructions are executed by the one or more processors, the first electronic device is enabled to further perform the following steps:

sending the adding request to the third user when determining that the third address book does not include the first mobile phone number; and after receiving an indication that the third user agrees adding, sending the third mobile phone number to the first user, so that the first user saves the third mobile phone number into the first address book.

According to a fifth aspect, an embodiment of this application further provides a terminal device. The electronic device includes modules/units that perform the method according to any one of the first aspect or the possible designs of the first aspect. These modules/units may be implemented by hardware, or may be implemented by hardware executing corresponding software.

According to a sixth aspect, an embodiment of this application further provides a cloud server. The cloud server includes modules/units that perform the method according to any one of the second aspect or the possible designs of the second aspect. These modules/units may be implemented by hardware, or may be implemented by hardware executing corresponding software.

According to a seventh aspect, a system is further provided, including:

at least three terminal devices and a cloud server, where each of the at least three terminal devices is corresponding to one mobile phone number, each terminal device is configured to implement the method provided in the first aspect, and the cloud server is configured to implement the method provided in the second aspect.

According to an eighth aspect, an embodiment of this application further provides a chip. The chip is coupled to a memory in an electronic device, and is configured to invoke a computer program stored in the memory and execute the technical solution in any one of the first aspect of the embodiments of this application and the possible designs of the first aspect, or configured to invoke a computer program stored in the memory and execute the technical solution in any one of the second aspect of the embodiments of this application and the possible designs of the second aspect. In the embodiments of this application, "couple" means that two components are directly or indirectly combined with each other.

According to a ninth aspect, a computer-readable storage medium is further provided, where the computer-readable storage medium includes a computer program, and when the computer program is run on an electronic device, the electronic device is enabled to perform the method provided in the first aspect; or when the computer program is run on an electronic device, the electronic device is enabled to perform the method provided in the second aspect.

According to a tenth aspect, a program product is further provided, including instructions. When the instructions are run on a computer, the computer is enabled to perform the method provided in the first aspect; or when the instructions are run on a computer, the computer is enabled to perform the method provided in the second aspect.

According to an eleventh aspect, a graphical user interface on an electronic device is further provided. The electronic device includes a display, one or more memories, and one or more processors. The one or more processors are configured to execute one or more computer programs stored in the one or more memories. The graphical user interface includes a graphical user interface displayed when the electronic device performs the method provided in the first aspect or the method provided in the second aspect.

According to a twelfth aspect, a method for protecting privacy of a group member in a group is further provided, where the method is applicable to a communications system, the communications system includes a terminal device and a cloud server, and the method includes:

displaying, by the terminal device, a group member list of a group, where the group member list includes a first user and a second user;

in response to an operation of adding the first user as a contact, sending, by the terminal device, first verification information to the first user by using the cloud server, so that the first user determines, by using the first verification information, whether to agree to be added as a contact of the terminal device;

in response to a consent instruction of the first user, saving, by the terminal device, the first user as a contact; and in response to an operation of adding the second user as a contact, determining, by the terminal device, whether a mobile phone number of the second user exists in a historical communication record, and if yes, automatically saving the second user as a contact; or in response to an operation of adding the second user as a contact, sending a query request to the cloud server, so as to request the cloud server to determine whether an address book of the second user includes a mobile phone number of a user of the terminal device, and if yes, receiving the mobile phone number of the second user from the cloud server, and saving the second user as a contact.

That is, if user A in a group wants to add user B to a local address book, there are two manners. In one manner, user A sends verification information to user B, and adds user B as a contact with the consent of the other party. In the other manner, when user B exists in a historical communication record of user A or user A exists in an address book of user B, user A may directly save user B as a contact without sending verification information to user B.

In a possible design, the method further includes: when the terminal device determines that the mobile phone number of the second user does not exist in the historical communication record, sending, by the terminal device, verification information to the second user by using the cloud server, so that the second user determines, by using the verification information, whether to agree to be added as a contact of the terminal device; and in response to a consent instruction of the second user, saving, by the terminal device, the second user as a contact.

In a possible design, the method further includes: when the terminal device determines, from the cloud server side, that the address book of the second user does not include the mobile phone number of the user of the terminal device, sending verification information to the second user by using the cloud server, so that the second user determines, by using the verification information, whether to agree to be added as a contact of the terminal device; and in response to a consent instruction of the second user, saving, by the terminal device, the second user as a contact.

According to a thirteenth aspect, a system is provided, including a terminal device and a cloud server.

The terminal device displays a group member list of a group, where the group member list includes a first user and a second user;

the terminal device displays a first nickname and a first profile picture of the first user in response to an operation of selecting the first user;

the terminal device displays a second nickname and a second profile picture of the second user in response to an operation of selecting the second user;

in response to an operation of adding the first user as a contact, the terminal device sends verification information to the first user by using the cloud server, so that the first user determines, based on the verification information, whether to agree to be added as a contact of the terminal device;

in response to a consent instruction of the first user, the terminal device saves the first user as a contact; and in response to an operation of adding the second user as a contact, the terminal device determines whether a mobile phone number of the second user exists in a historical communication record, and if yes, automatically saves the second user as a contact; or in response to an operation of adding the second user as a contact, sends a query request to the cloud server, so as to request the cloud server to determine whether an address book of the second user includes a mobile phone number of the user of the terminal device, and if yes, receives the mobile phone number of the second user from the cloud server, and saves the second user as a contact.

In a possible design, the terminal device is further configured to: when it is determined that the mobile phone number of the second user does not exist in the historical communication record, send, by the terminal device, verification information to the second user by using the cloud server, so that the second user determines, by using the verification information, whether to agree to be added as a contact of the terminal device; and in response to a consent instruction of the second user, save the second user as a contact.

In a possible design, the terminal device is further configured to: when it is determined, from the cloud server side, that the address book of the second user does not include the mobile phone number of the user of the terminal device, send verification information to the second user by using the cloud server, so that the second user determines, by using the verification information, whether to agree to be added as a contact of the terminal device; and save the second user as a contact in response to a consent instruction of the second user.

According to a fourteenth aspect, a computer-readable storage medium is further provided. The computer-readable storage medium includes a computer program. When the computer program runs on an electronic device, the electronic device is enabled to perform the method according to the twelfth aspect.

According to a fifteenth aspect, a program product is further provided. The program product includes instructions, and when the instructions are run on a computer, the computer is enabled to perform the method according to the twelfth aspect.

According to a sixteenth aspect, a graphical user interface on an electronic device is further provided. The electronic device includes a display, one or more memories, and one or more processors. The one or more processors are configured to execute one or more computer programs stored in the one or more memories. The graphical user interface includes a graphical user interface displayed when the electronic device performs the method according to the twelfth aspect.

According to a seventeenth aspect, a method for protecting privacy of a group member in a group is provided, where the method includes: displaying, by a terminal device, a group member list of a group in an instant messaging application, where the group member list includes a first group member and a second group member;

displaying, by the terminal device in response to a first operation used for selecting the first group member, a first phone number of the first group member, where the first phone number is a phone number of the first group member that is saved in an address book of the terminal device; displaying, by the terminal device in response to a second operation used for selecting the second group member, a profile picture and/or a user name of the second group member, and a control used for adding a contact; sending, by the terminal device, a first request to a cloud server in response to a third operation for the contact adding control, where the first request is used for requesting to add the second group member as a contact; sending, by the cloud server, a second phone number of the second group member to the terminal device in response to the first request; and saving, by the terminal device, the second group member as a contact based on the second phone number.

In other words, when the terminal device views different group members in the group, different information is displayed. For example, the phone number of the first group member may be seen, because the first group member exists in the address book of the terminal device. However, the phone number of the second group member cannot be directly seen, and the phone number of the second group member can be obtained only by adding the second group member as a contact. In this manner, the phone number of the group member may not be directly exposed to all members in the group, and privacy of the group member is protected.

In a possible design, the sending, by the cloud server, a second phone number of the second group member to the terminal device in response to the first request includes: in response to the first request, sending, by the cloud server, a second request to the second group member, where the second request is used for indicating that the terminal device requests to add the second group member as a contact; and sending, by the cloud server, the second phone number of the second group member to the terminal device when receiving a consent instruction from the second group member.

That is, before sending the phone number of the second group member to the terminal device, the cloud server requests authentication of the second group member, and sends the phone number of the second group member to the terminal device in a case in which the second group member agrees, which is relatively secure.

In a possible design, the sending, by the terminal device, a first request to a cloud server in response to a third operation for the contact adding control includes: in response to the third operation, determining, by the terminal device, whether a phone number of the second group member exists in a historical communication record of the terminal device; and sending, by the terminal device, the first request to the cloud server when determining that the phone number of the second group member does not exist in the historical communication record.

That is, the terminal device may first determine whether the phone number of the second group member exists in the historical communication record, and if yes, save the second group member as a contact; otherwise, request the phone number of the second group member from the cloud server side. In this way, a phone number of a group member is not exposed to all members in the group, protecting privacy of the group member.

In a possible design, the determining, by the terminal device, whether a phone number of the second group member exists in a historical communication record of the terminal device includes: searching, by the terminal device, profile pictures corresponding to all numbers in a historical call record for a profile picture that matches the profile picture of the second group member, and/or searching, by the terminal device, user names corresponding to all the numbers in the historical call record for a user name that matches the user name of the second group member; and when no profile picture that matches the profile picture of the second group member is found in the historical communication record, and/or no user name that matches a user ticket of the second group member is found, determining that the phone number of the second group member is not in the historical communication record.

In other words, the terminal device may search, in a profile picture matching manner and/or a user name matching manner, for whether the phone number of the second group member exists in the historical communication record, which is convenient to operate.

In a possible design, the determining, by the terminal device, whether a phone number of the second group member exists in a historical communication record of the terminal device includes: sending, by the terminal device, the historical communication record to the cloud server; sending, by the terminal device, a third request to the cloud server, where the third request is used for requesting to determine whether the phone number of the second group member exists in the historical communication record; determining, by the cloud server in response to the third request, whether the phone number of the second group member exists in the historical communication record, and sending a determining result to the terminal device; and determining, by the terminal device based on the determining result, whether the phone number of the second group member exists in the historical communication record.

In other words, the terminal device may alternatively query, by using the cloud server, whether the phone number of the second group member exists in the historical communication record. This manner has relatively high accuracy.

In a possible design, the historical communication record includes a recent call record and/or a historical SMS message record. In other words, the terminal device may search the recent call record and/or the historical SMS message record for the phone number of the second group member.

In a possible design, the cloud server stores an address book of the second group member, and the sending, by the cloud server, a second phone number of the second group member to the terminal device in response to the first request includes: in response to the first request, determining, by the cloud server, whether a phone number of the terminal device exists in the address book of the second group member; and when the cloud server determines that the phone number of the terminal device exists in the address book of the second group member, sending the second phone number of the second group member to the terminal device.

That is, the cloud server may determine whether an address book of the other party (that is, the second group member) includes the phone number of the terminal device.

If yes, the phone number of the other party may be directly sent to the terminal device. In this manner, the phone number of the second group member is not directly exposed.

In a possible design, the method further includes: when the cloud server determines that the phone number of the terminal device does not exist in the address book of the second group member, sending, by the cloud server, the second request to the second group member, where the second request is used for indicating that the terminal device requests to add the second group member as a contact; and sending, by the cloud server, the second phone number of the second group member to the terminal device when receiving the consent instruction from the second group member.

In other words, the cloud server may determine whether the address book of the other party (that is, the second group member) includes the phone number of the terminal device. If the address book does not include the phone number of the terminal device, the cloud server may request confirmation of the second group member, and send the phone number of the second group member to the terminal device when the second group member agrees. This manner is more secure.

In a possible design, before the displaying, by a terminal device, a group member list of a group in an instant messaging application, the method further includes: displaying, by the terminal device, first group joining information, where the first group joining information is used for indicating that the first group member is invited to join a group chat, and information about the first group member that is displayed in the first group joining message is a remark name that is of the first group member and that is in the address book of the terminal device; and displaying, by the terminal device, second group joining information, where the second group joining information is used for indicating that the second group member is invited to join the group chat, and information about the second group member that is displayed in the second group joining message is the user name of the second group member.

That is, when the address book of the terminal device does not include the second group member, the user name is displayed for the second group member in the second group joining information, so as to avoid directly exposing the phone number of the second group member in the group joining information (for example, XXX joins the group chat).

In a possible design, an inviter for inviting the first group member to join the group is a first inviter, and an inviter for inviting the second group member to join the group is a second inviter. When the first inviter exists in the address book of the terminal device, information about the first inviter that is displayed in the first group joining message is a remark name that is of the first inviter and that is in the address book; or when the first inviter does not exist in the address book of the terminal device, the information about the first inviter that is displayed in the first group joining message is a user name of the first inviter. When the second inviter exists in the address book of the terminal device, information about the second inviter that is displayed in the second group joining message is a remark name that is of the second inviter and that is in the address book; or when the second inviter does not exist in the address book of the terminal device, the information about the second inviter that is displayed in the second group joining message is a user name of the second inviter.

That is, when an inviter and/or an invitee do/does not exist in the address book of the terminal device, a user name is displayed; if the inviter and/or the invitee exists in the address book of the terminal device, a remark name is displayed. In this manner, a phone number of the inviter and/or a phone number of the invitee are/is not directly exposed in the group joining information (for example, XXX invites YYY to join the group chat).

In a possible design, the sending, by the terminal device, a first request to a cloud server in response to a third operation for the contact adding control includes: displaying, by the terminal device, a first interface in response to the third operation, where the first interface includes a verification information input box; receiving, by the terminal device, an input operation, where the input operation is used for entering verification information in the verification information input box, and the verification information is used for describing user identity information of the terminal device; and sending, by the terminal device, the first request to the server in response to a fourth operation used for sending the verification information, where the first request carries the verification information.

In other words, the terminal device may send verification information to the second group member, for example, "I am AAA in the group chat", so that the second group member can identify an identity of the other party based on the verification information, and security is higher.

According to an eighteenth aspect, a method for protecting privacy of a group member in a group is provided, and the method is applicable to a terminal device. The method includes: displaying, by a terminal device, a group member list of a group in an instant messaging application, where the group member list includes a first group member and a second group member; displaying, by the terminal device in response to a first operation used for selecting the first group member, a first phone number of the first group member, where the first phone number is a phone number of the first group member that is saved in an address book of the terminal device; displaying, by the terminal device in response to a second operation used for selecting the second group member, a profile picture and/or a user name of the second group member, and a control used for adding a contact; sending, by the terminal device, a first request to a cloud server in response to a third operation for the contact adding control, where the first request is used for requesting to add the second group member as a contact; receiving, by the terminal device, a second phone number of the second group member from the cloud server; and saving, by the terminal device, the second group member as a contact based on the second phone number.

In a possible design, the sending, by the terminal device, a first request to a cloud server in response to a third operation for the contact adding control includes: in response to the third operation, determining, by the terminal device, whether a phone number of the second group member exists in a historical communication record of the terminal device; and sending, by the terminal device, the first request to the cloud server when determining that the phone number of the second group member does not exist in the historical communication record.

In a possible design, the determining, by the terminal device, whether a phone number of the second group member exists in a historical communication record of the terminal device includes: searching, by the terminal device, profile pictures corresponding to all numbers in a historical call record for a profile picture that matches the profile picture of the second group member, and/or searching, by the terminal device, user names corresponding to all the numbers in the historical call record for a user name that matches the user name of the second group member; and when no profile picture that matches the profile picture of the second group member is found in the historical communication record, and/or no user name that matches the user name of the second group member is found, determining that the phone number of the second group member is not in the historical communication record.

In a possible design, the determining, by the terminal device, whether a phone number of the second group member exists in a historical communication record of the terminal device includes: sending, by the terminal device, the historical communication record to the cloud server;

sending, by the terminal device, a third request to the cloud server, where the third request is used for requesting to determine whether a phone number of the second group member exists in the historical communication record; determining, by the cloud server in response to the third request, whether the phone number of the second group member exists in the historical communication record, and sending a determining result to the terminal device; and determining, by the terminal device based on the determining result, whether the phone number of the second group member exists in the historical communication record.

In a possible design, the historical communication record includes a recent call record and/or a historical SMS message record.

In a possible design, before the displaying, by a terminal device, a group member list of a group in an instant messaging application, the method further includes: displaying, by the terminal device, first group joining information, where the first group joining information is used for indicating that the first group member is invited to join a group chat, and information about the first group member that is displayed in the first group joining message is a remark name that is of the first user and that is in the address book of the terminal device; and displaying, by the terminal device, second group joining information, where the second group joining information is used for indicating that the second group member is invited to join the group chat, and information about the second group member that is displayed in the second group joining message is the user name of the second group member.

In a possible design, an inviter for inviting the first group member to join the group is a first inviter; and an inviter for inviting the second group member to join the group is a second inviter. When the first inviter exists in the address book of the terminal device, information about the first inviter that is displayed in the first group joining message is a remark name that is of the first inviter and that is in the address book; or when the first inviter does not exist in the address book of the terminal device, the information about the first inviter that is displayed in the first group joining message is a user name of the first inviter. When the second inviter exists in the address book of the terminal device, information about the second inviter that is displayed in the second group joining message is a remark name that is of the second inviter and that is in the address book; or when the second inviter does not exist in the address book of the terminal device, the information about the second inviter that is displayed in the second group joining message is a user name of the second inviter.

In a possible design, the sending, by the terminal device, a first request to a cloud server in response to a third operation for the contact adding control includes: displaying, by the terminal device, a first interface in response to the third operation, where the first interface includes a verification information input box; receiving, by the terminal device, an input operation, where the input operation is used for entering verification information in the verification information input box, and the verification information is used for describing user identity information of the terminal device; and sending, by the terminal device, the first request to the server in response to a fourth operation used for sending the verification information, where the first request carries the verification information.

According to a nineteenth aspect, a method for protecting privacy of a group member in a group is provided, and the method may be applied to a cloud server. The method includes: A cloud server creates a group of an instant messaging application, where the group includes a third group member and a second group member; the cloud server receives a first request from the third group member, where the first request is used for requesting to add the second group member as a contact; and the cloud server sends a second telephone number of the second group member to the third group member in response to the first request.

It should be noted that, in a current solution, when creating a group or a new member joins a group, the cloud server publishes a phone number of each group member. Therefore, each group member can see a phone number of another group member, and user privacy cannot be protected. In this application, the cloud server discloses the phone number of the second group member to the third group member only when receiving the request that is from the third group member and that is used for adding the second group member as a contact, so as to avoid direct exposure of the phone number of the second group member, thereby ensuring relatively high security.

In a possible design, that the cloud server sends a second phone number of the second group member to the third group member in response to the first request includes:

in response to the first request, the cloud server sends a second request to the second group member, where the second request is used for indicating that the third group member requests to add the second group member as a contact; and the cloud server sends the second telephone number of the second group member to the third group member when receiving a consent instruction from the second group member.

In a possible design, that the cloud server sends a second phone number of the second group member to the third group member in response to the first request includes:

in response to the first request, the cloud server determines whether a phone number of the second group member exists in a historical communication record of the third group member; and when it is determined that the phone number of the second group member exists in the historical communication record, the cloud server sends the phone number of the second group member to the third group member.

In a possible design, the method further includes: When it is determined that the phone number of the second group member does not exist in the historical communication record, the cloud server sends a second request to the second group member, where the second request is used for indicating that the third group member requests to add the second group member as a contact; and the cloud server sends the second telephone number of the second group member to the third group member when receiving a consent instruction from the second group member.

In a possible design, the historical communication record includes a recent call record and/or a historical SMS message record.

In a possible design, the cloud server stores an address book of the second group member, and that the cloud server sends a second phone number of the second group member to the third group member in response to the first request includes:

in response to the first request, the cloud server determines whether the phone number of the third group member exists in the address book of the second group member; and when the cloud server determines that the phone number of the third group member exists in the address book of the second group member, the cloud server sends the second phone number of the second group member to the third group member.

In a possible design, the method further includes: When the cloud server determines that the phone number of the third group member does not exist in the address book of the second group member, the cloud server sends a second request to the second group member, where the second request is used for indicating that the terminal device requests to add the second group member as a contact; and the cloud server sends the second telephone number of the second group member to the third group member when receiving a consent instruction from the second group member.

In a possible design, before the cloud server receives the first request from the third group member, the method further includes:

when determining that the second group member joins the group, the cloud server sends second group joining information to the third group member, where the second group joining information is used for indicating that the second group member is invited to join the group chat, and information about the second group member displayed in the second group joining message is a user name of the second group member.

In a possible design, an inviter for inviting the second group member to join the group is a second inviter; and when the second inviter exists in the address book of the third group member, information about the second inviter displayed in the second group joining message is a remark name of the second inviter in the address book of the third group member; or when the second inviter does not exist in the address book of the third group member, information about the second inviter displayed in the second group joining message is a user name of the second inviter.

In a possible design, the method further includes: When determining that the first group member joins the group, the cloud server sends first group joining information to the third group member, where the first group joining information is used for indicating that the first group member is invited to join the group chat, and information about the first group member displayed in the first group joining message is a remark name of the first group member in the address book of the third group member.

In a possible design, an inviter for inviting the first group member to join a group is a first inviter; and when the first inviter exists in the address book of the third group member, information about the first inviter displayed in the first group joining message is a remark name of the first inviter in the address book of the third group member; or when the first inviter does not exist in the address book of the third group member, information about the first inviter displayed in the first group joining message is a user name of the first inviter.

In a possible design, the first request carries verification information of the third contact, the second request carries verification information of the third contact, and the verification information is used to describe identity information of the third contact.

According to a twentieth aspect, a communications system is provided, including: a terminal device and a cloud server, where the terminal device includes a processor and a memory, where the memory stores one or more computer programs, the one or more computer programs include instructions, and when the instructions are executed by the processor, the terminal device is enabled to perform the steps of the terminal device in the method provided in the seventeenth aspect.

The cloud server includes a processor and a memory, where the memory stores one or more computer programs, the one or more computer programs include instructions, and when the instructions are executed by the processor, the cloud server is enabled to perform the steps of the cloud server in the method provided in the seventeenth aspect.

According to a twenty-first aspect, a terminal device is provided, including:

a processor, a memory, and one or more programs.

The one or more programs are stored in the memory, the one or more programs include instructions, and when the instructions are executed by the processor, the terminal device is enabled to perform the method steps provided in the eighteenth aspect.

According to a twenty-second aspect, a cloud server is provided, including:

a processor, a memory, and one or more programs.

The one or more programs are stored in the memory, the one or more programs include instructions, and when the instructions are executed by the processor, the terminal device is enabled to perform the method steps provided in the nineteenth aspect.

According to a twenty-third aspect, a computer-readable storage medium is provided. The computer-readable storage medium is configured to store a computer program. When the computer program runs on a computer, the computer is enabled to perform the method provided in any one of the seventeenth aspect to the nineteenth aspect.

According to a twenty-fourth aspect, a computer program product is provided, including a computer program. When the computer program runs on a computer, the computer is enabled to perform the method provided in any one of the seventeenth aspect to the nineteenth aspect.

According to a twenty-fifth aspect, a graphical user interface on an electronic device is provided. The electronic device includes a display, a memory, and a processor. The processor is configured to execute one or more computer programs stored in the memory. The graphical user interface includes a graphical user interface displayed when the electronic device performs the method provided in any one of the seventeenth aspect to the nineteenth aspect.

According to a twenty-sixth aspect, an embodiment of this application further provides a chip. The chip is coupled to a memory in an electronic device, and is configured to invoke a computer program stored in the memory and execute the technical solutions in the seventeenth aspect to the nineteenth aspect of the embodiments of this application. In the embodiments of this application, "couple" means that two components are directly or indirectly combined with each other.

For beneficial effects of the eighteenth aspect to the twenty-sixth aspect, refer to the beneficial effects of the seventeenth aspect. Details are not described again.

BRIEF DESCRIPTION OF DRAWINGS

FIG. 2A to FIG. 2D are schematic diagrams of GUIs of instant messaging applications according to an embodiment of this application;

FIG. 5B is a schematic diagram of GUIs for creating a group in an instant messaging application according to an embodiment of this application;

DESCRIPTION OF EMBODIMENTS

Figure 1A:
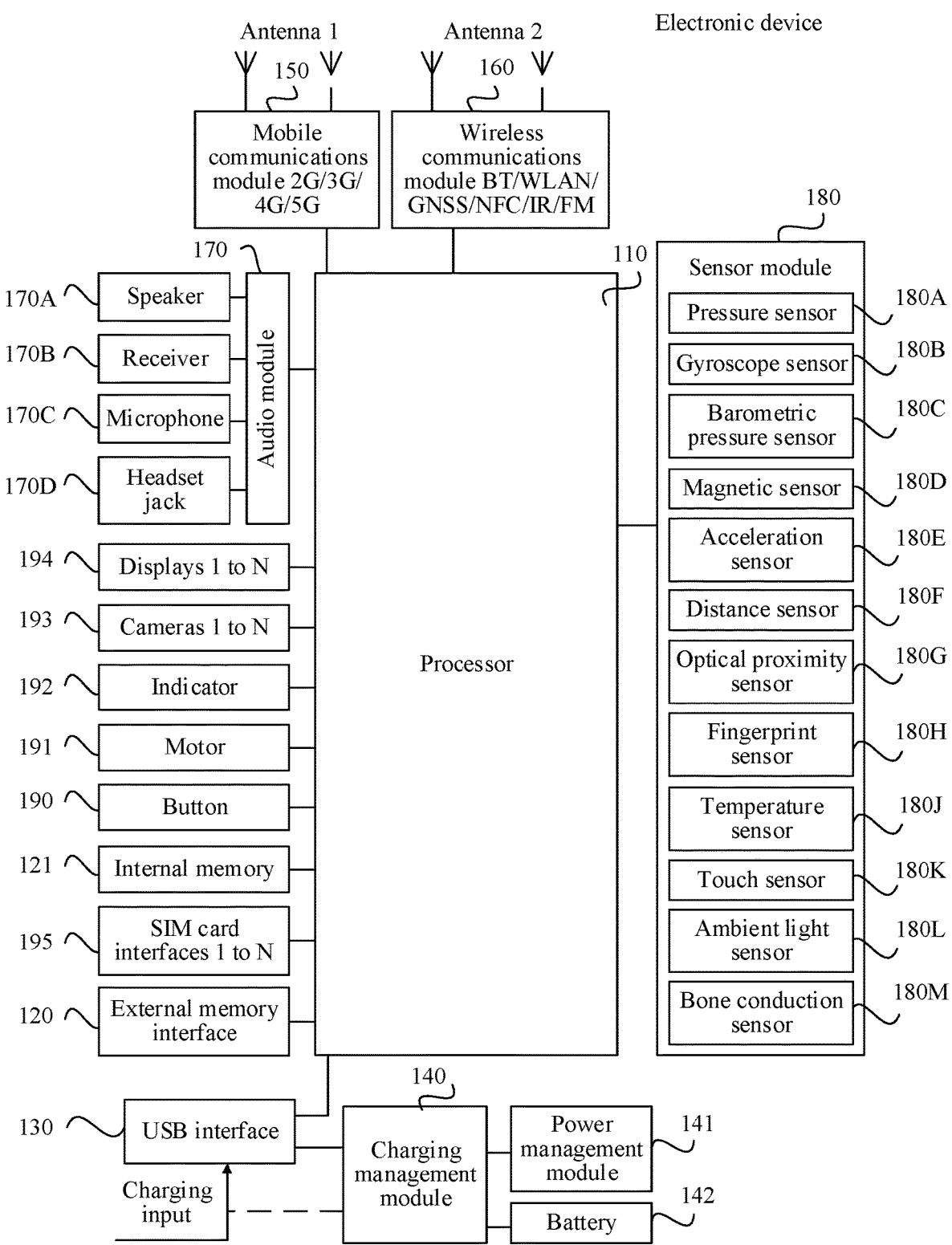
FIG. 1A is a schematic diagram of a hardware structure of a terminal device according to an embodiment of this application.

The following describes some terms in embodiments of this application, to facilitate understanding of a person skilled in the art.

(1) Application (application, app)

An application is a software program that can implement one or more specific functions. There may be a plurality of types of applications, such as a video playback application, an image shooting application, and an instant messaging application. The instant messaging application includes, for example, HUAWEI MeeTime, various mailbox applications, WeChat® (WeChat®), Tencent Chat Software® (QQ®), WhatsApp Messenger®, Line® (Line®), Kakao Talk®, or DingTalk®. The application mentioned in the following may be an application installed when the electronic device is delivered from a factory, or may be an application downloaded by a user from a network or obtained from another electronic device in a process of using the electronic device (for example, an application sent by another electronic device).

(2) A mobile phone address book refers to a contact list in which a phone number is stored in the mobile phone. A user may search for a contact in a mobile phone address book of the user, and then dial a phone number of the contact.

(3) In embodiments of this application, "at least one" means one or more, and "a plurality of" means two or more. The term "and/or" describes an association relationship for describing associated objects and represents that three relationships may exist. For example, A and/or B may represent the following three cases: Only A exists, both A and B exist, and only B exists. A and B each may be singular or plural. The character "/" generally indicates an "or" relationship between the associated objects. At least one of the following items (pieces) or a similar expression thereof refers to any combination of these items, including any combination of singular items (pieces) or plural items (pieces).

In addition, unless otherwise stated, in embodiments of this application, ordinal numbers such as "first" and "second" are intended to distinguish between a plurality of objects, but are not intended to limit sizes, content, orders, time sequences, priorities, importance, or the like of the plurality of objects. For example, a first user, a second user, and a third user are merely intended to distinguish between different users, but do not indicate different priorities, importance degrees, or the like of these users.

A method for protecting privacy of a group member in a group provided in embodiments of this application may be applied to an electronic device. The following describes an electronic device, a graphical user interface (graphical user interface, GUI) used for such an electronic device, and embodiments for using such an electronic device. In some embodiments of this application, the electronic device may be a portable electronic device, such as a mobile phone, a PAD, a portable computer, a wearable device (such as a smartwatch, smart glasses, a smart band, or a smart helmet) with a wireless communication function, or a vehicle-mounted device. An example embodiment of the portable electronic device includes but is not limited to a portable electronic device using iOS®, Android®, Microsoft®, or another operating system.

For example, FIG. 1A is a schematic diagram of a structure of an electronic device.

As shown in FIG. 1A, the electronic device may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors. The controller may be a nerve center and a command center of the electronic device. The controller may generate an operation control signal based on an instruction operation code and a time sequence signal, to complete control of instruction reading and instruction execution. A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

The USB interface 130 is an interface that conforms to a USB standard specification, and may be specifically a mini USB interface, a micro USB interface, a USB type-C interface, or the like. The USB interface 130 may be configured to connect to a charger to charge the electronic device, may be configured to transmit data between the electronic device and a peripheral device, or The charging management module 140 is configured to receive a charging input from a charger. The power management module 141 is configured to connect to the battery 142, the charging management module 140, and the processor 110. The power management module 141 receives input of the battery 142 and/or the charging management module 140, to supply power to the processor 110, the internal memory 121, an external memory, the display 194, the camera 193, the wireless communications module 160, and the like.

A wireless communication function of the electronic device may be implemented by using the antenna 1, the antenna 2, the mobile communications module 150, the wireless communications module 160, the modem processor, the baseband processor, and the like. The antenna 1 and the antenna 2 are configured to transmit and receive an electromagnetic wave signal. Each antenna of the electronic device may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a solution that includes wireless communication such as 2G/3G/4G/5G and that is applied to the electronic device. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules of the mobile communications module 150 may be disposed in a same device as at least some modules of the processor 110.

The wireless communications module 160 may provide a wireless communication solution, applied to the electronic device, that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like. The wireless communications module 160 may be one or more components integrating at least one communications processor module. The wireless communications module 160 receives an electromagnetic wave by the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device, the antenna 1 and the mobile communications module 150 are coupled, and the antenna 2 and the wireless communications module 160 are coupled, so that the electronic device can communicate with a network and another device by using a wireless communication technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The display 194 is configured to display a display interface of an application, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device may include one or N displays 194, where N is a positive integer greater than 1.

The camera 193 is configured to capture a static image or a video. The camera 193 may include a front-facing camera and a rear-facing camera.

The internal memory 121 may be configured to store computer-executable program code. The executable program code includes instructions. The processor 110 runs the instructions stored in the internal memory 121, to perform various function applications and data processing of the electronic device. The internal memory 121 may include a program storage area and a data storage area. The program storage area may store an operating system, software code of at least one application (for example, iQIYI or WeChat), and the like. The data storage area may store data (for example, an image or a video) generated in a process of using the electronic device, and the like. In addition, the internal memory 121 may include a high-speed random access memory, or may include a nonvolatile memory, for example, at least one magnetic disk storage device, a flash memory, or a universal flash storage (universal flash storage, UFS).

The external memory interface 120 may be configured to connect to an external storage card, for example, a micro SD card, to extend a storage capability of the electronic device. The external memory card communicates with the processor 110 through the external memory interface 120, to implement a data storage function. For example, files such as images or videos are stored in the external storage card.

The electronic device may implement audio functions by using the audio module 170, the speaker 170A, the receiver 170B, the microphone 170C, the headset jack 170D, the application processor, and the like. The audio functions are, for example, music playback and recording.

The pressure sensor 180A is configured to sense a pressure signal, and can convert the pressure signal into an electrical signal. In some embodiments, the pressure sensor 180A may be disposed on the display 194. The gyroscope sensor 180B may be configured to determine a motion posture of the electronic device. In some embodiments, an angular velocity of the electronic device around three axes (namely, axes x, y, and z) may be determined by using the gyroscope sensor 180B.

The gyroscope sensor 180B may be configured to implement image stabilization during photographing. The barometric pressure sensor 180C is configured to measure barometric pressure. In some embodiments, the electronic device calculates an altitude based on a value of the barometric pressure measured by the barometric pressure sensor 180C, to assist in positioning and navigation. The magnetic sensor 180D includes a Hall sensor. The electronic device may detect opening and closing of a flip cover by using the magnetic sensor 180D. In some embodiments, when the electronic device is a flip phone, the electronic device may detect opening and closing of a flip cover by using the magnetic sensor 180D. Further, a feature such as automatic unlocking upon opening of the flip cover is set according to the detected opening/closing state of the flip cover. The acceleration sensor 180E may detect magnitudes of accelerations of the electronic device in all directions (usually on three axes), and Magnitude and a direction of gravity can be detected when the electronic device is still. The acceleration sensor 180E may be further configured to identify a posture of the electronic device, and is used in an application such as switching between a landscape mode and a portrait mode or a pedometer.

The distance sensor 180F is configured to measure a distance. The electronic device may measure the distance through infrared or laser. In some embodiments, in a photographing scenario, the electronic device may measure the distance by using the distance sensor 180F, to implement quick focusing. The optical proximity sensor 180G may include, for example, a light emitting diode (LED) and an optical detector, for example, a photodiode. The light emitting diode may be an infrared light emitting diode. The electronic device emits infrared light by using the light-emitting diode. The electronic device detects reflected infrared light from a nearby object by using the photodiode. When detecting sufficient reflected light, the electronic device may determine that there is an object near the electronic device. When detecting insufficient reflected light, the electronic device may determine that there is no object near the electronic device. The electronic device may detect, by using the optical proximity sensor 180G, that the user holds the electronic device close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device is in a pocket, to avoid an unintentional touch. The fingerprint sensor 180H is configured to collect a fingerprint. The electronic device may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device executes a temperature processing policy by using the temperature detected by the temperature sensor 180J. For example, when the temperature reported by the temperature sensor 180J exceeds a threshold, the electronic device degrades performance of a processor near the temperature sensor 180J, to reduce power consumption and implement thermal protection. In some other embodiments, when the temperature is lower than another threshold, the electronic device heats the battery 142, to avoid an abnormal shutdown of the electronic device caused by a low temperature. In some other embodiments, when the temperature is lower than still another threshold, the electronic device boosts an output voltage of the battery 142, to avoid an abnormal shutdown caused by a low temperature.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may be alternatively disposed on a surface of the electronic device, and is located on a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal.

The button 190 includes a power button, a volume button, and the like. The button 190 may be a mechanical button, or may be a touch button. The electronic device may receive a button input, and generate a button signal input related to user settings and function control of the electronic device. The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or removed from the SIM card interface 195, to implement contact with or separation from the electronic device.

It may be understood that the components shown in FIG. 1A do not constitute a specific limitation on the electronic device. The electronic device in embodiments of the present invention may include more or fewer components than those in FIG. 1A. In addition, a combination/connection relationship between the components in FIG. 9 may be adjusted and modified.

Figure 1B:
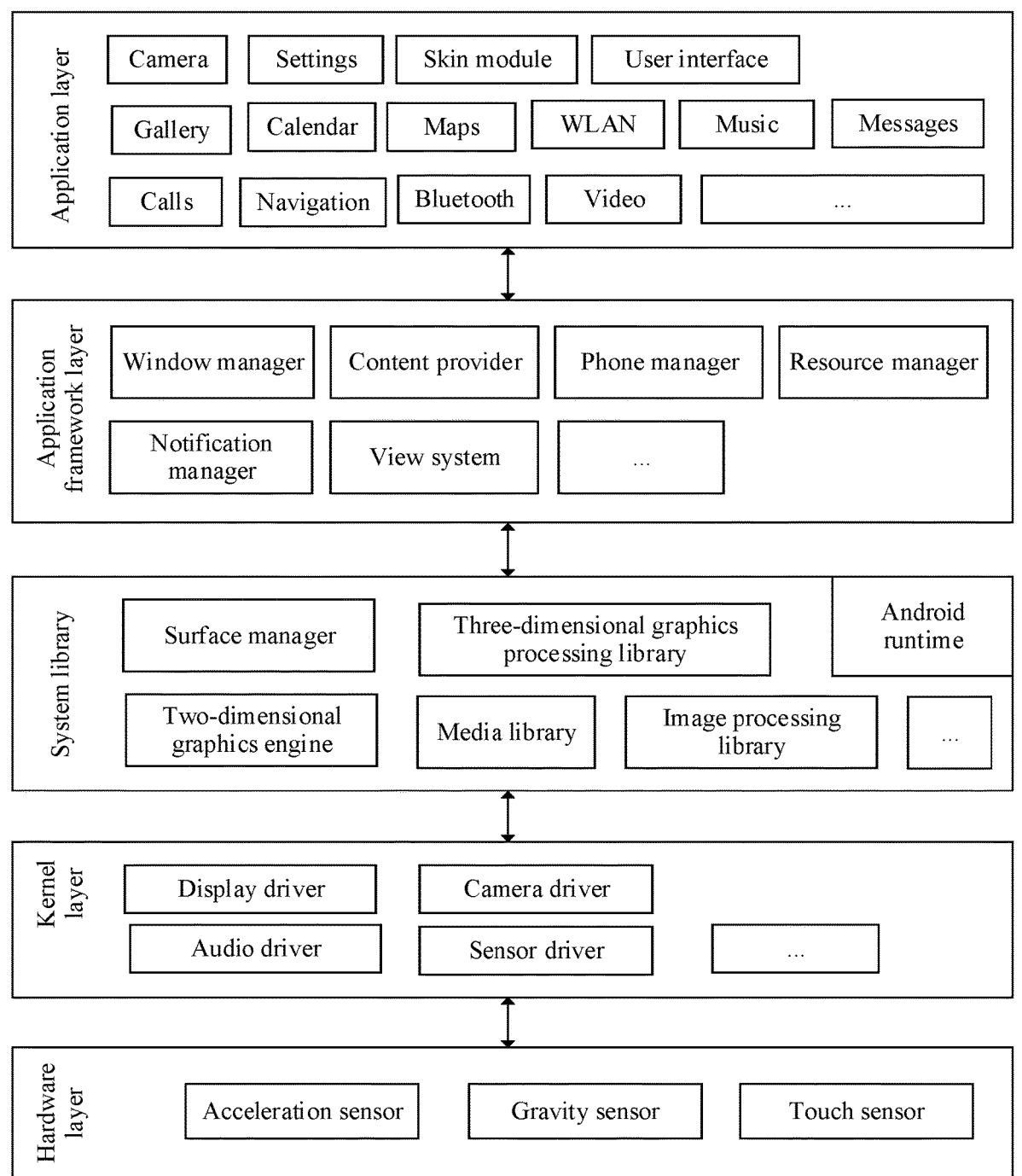
FIG. 1B is a schematic diagram of a software structure of a terminal device according to an embodiment of this application.

FIG. 1B is a block diagram of a software structure of an electronic device according to an embodiment of this application.

As shown in FIG. 1B, the software structure of the electronic device may be a layered architecture. For example, software may be divided into several layers, and each layer has a clear role and responsibility. The layers communicate with each other through a software interface. In some embodiments, an Android system is divided into four layers: an application layer, an application framework (framework, FWK) layer, an Android runtime (Android runtime) and system library, and a kernel layer from top to bottom.

The application layer may include a series of application packages. As shown in FIG. 1B, the application layer may include Camera, Settings, Skin module, User interface (user interface, UI), third-party applications, and the like. The third-party applications may include WeChat®, QQ®, Gallery, Calendar, Calls, Maps, Navigation, WLAN, Bluetooth, Music, Video, Messages, and the like.

The application framework layer provides an application programming interface (application programming interface, API) and a programming framework for an application at the application layer. The application framework layer may include some predefined functions. As shown in FIG. 1B, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like. The content provider is used to store and obtain data and make the data accessible to an application. The data may include a video, an image, an audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function of the electronic device, for example, management of a call status (including answering, declining, or the like).

The resource manager provides various resources for the application, such as a localized string, an icon, a picture, a layout file, and a video file.

The notification manager enables an application to display notification information in a status bar, and may be configured to convey a notification type message, where the displayed notification information may automatically disappear after a short pause and require no user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be called in Java language and a kernel library of Android. The application layer and the application framework layer run in the virtual machine. The virtual machine executes java files at the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), media libraries (media libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats, for example, MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The hardware layer may include various types of sensors, for example, an acceleration sensor, a gyroscope sensor, and a touch sensor in embodiments of this application.

To facilitate contact with family members and friends, various types of instant messaging applications may be installed on a device (for example, a mobile phone or a tablet computer) of a user. Currently, mainstream instant messaging applications may be classified into two types: one type is an application that performs communication based on an independent account, and the other type is an application that performs communication based on a mobile phone number.

First type: instant messaging applications based on independent accounts. For such applications, the other party needs to be added as a friend to send messages to each other. For example, (a) in FIG. 2A is a schematic diagram of a friend list of a first-type instant messaging application. The friend list displays nicknames or remarks of added friends. The user can send messages to the friends in the friend list. For example, WeChat® (WeChat®), QQ®, Facetime Messager®, and Line® belong to first-type applications. There are a plurality of manners of adding a friend. For example, as shown in (a) in FIG. 2A, when the mobile phone detects an operation of tapping the button 101, an interface shown in (b) in FIG. 2A is displayed. The interface includes a plurality of manners of adding a friend, such as a search box, Scanning, and Mobile phone contact. It is assumed that the mobile phone detects an option of selecting Mobile phone contact by the user, and a mobile phone address book may be displayed. The user may select a contact from the mobile phone address book and send a request for adding a friend to the contact. If the contact is successfully added as a friend, the friend is added to the friend list, and the user and the friend may send messages to each other. In other words, for the first-type application, a friend needs to be added first even for a contact stored in the mobile phone address book, and then the user and the friend can send messages to each other.

A group (that is, a group chat) may be created for the first-type application. For example, the group includes user A, user B, and user C. Information about group members, such as profile pictures, nicknames, and personal signatures that are set during registration of the group members, may be displayed in the group. User A is used as an example. It is assumed that user C is not in a friend list of user A. If user A wants to chat with user C, user A may initiate an application for adding user C as a friend, so as to add user C as a friend. After user C agrees, user A and user C may send messages to each other.

Second type: instant messaging applications based on mobile phone numbers. A main feature of this type of application is that messages can be sent to each other without adding the other party as a friend like the first-type application, and a contact may be directly selected from a mobile phone address book in the second-type application to communicate with the contact. MeeTime is used as an example. After a user registers with MeeTime by using a mobile phone number, the user may query, in a mobile phone address book, which contacts have registered with Mee-Time, and then may directly establish a MeeTime call (for example, establish a video call, establish a voice call, or exchange messages) with these contacts in the mobile phone address book, and there is no need to first add the other party as a friend like the first-type application.

Figure 2B:
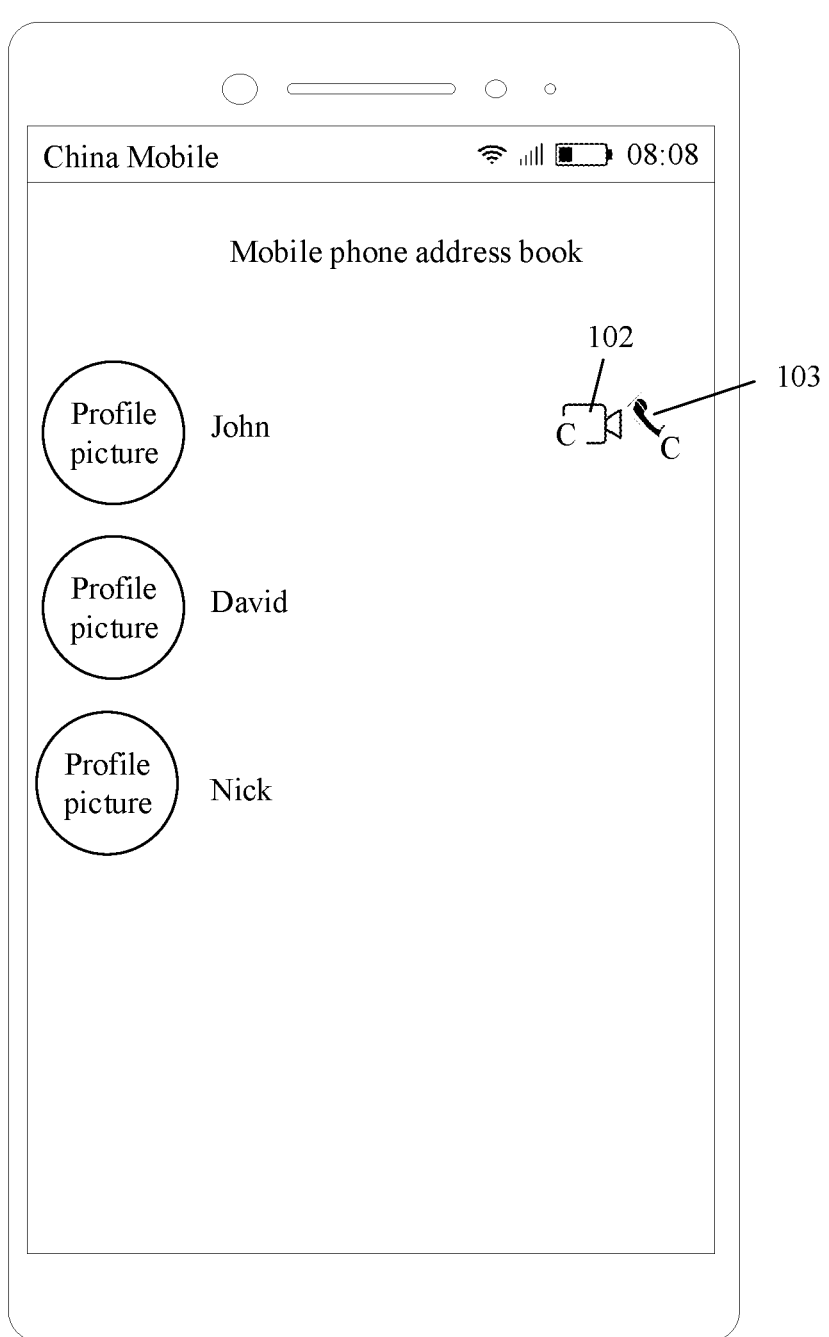

For example, refer to FIG. 2B. FIG. 2B is a schematic diagram of a mobile phone address book. The mobile phone address book includes contacts whose phone numbers have been stored in the mobile phone, for example, John, David, and Nick. If John has registered with MeeTime, a MeeTime mark is displayed in the address book of the mobile phone, for example, a video call mark 102 and a voice call mark 103. A user may initiate a MeeTime video call with John by using the video call mark 102, or initiate a MeeTime voice call with John by using the voice call mark 103. The operation is simple, and may be directly initiated in the mobile phone address book without adding a friend. Certainly, in addition to HUAWEI MeeTime, WhatsApp®, RCS®, and iMessage® are also second-type instant messaging applications. Compared with the first-type instant messaging application, the second-type instant messaging application is more convenient to operate.

A group may also be created in the second-type application. Different from the first-type application, because the second-type application performs communication based on a mobile phone number, currently, mobile phone numbers of group members in a group created by the second-type application are displayed in plaintext.

Figure 2C:
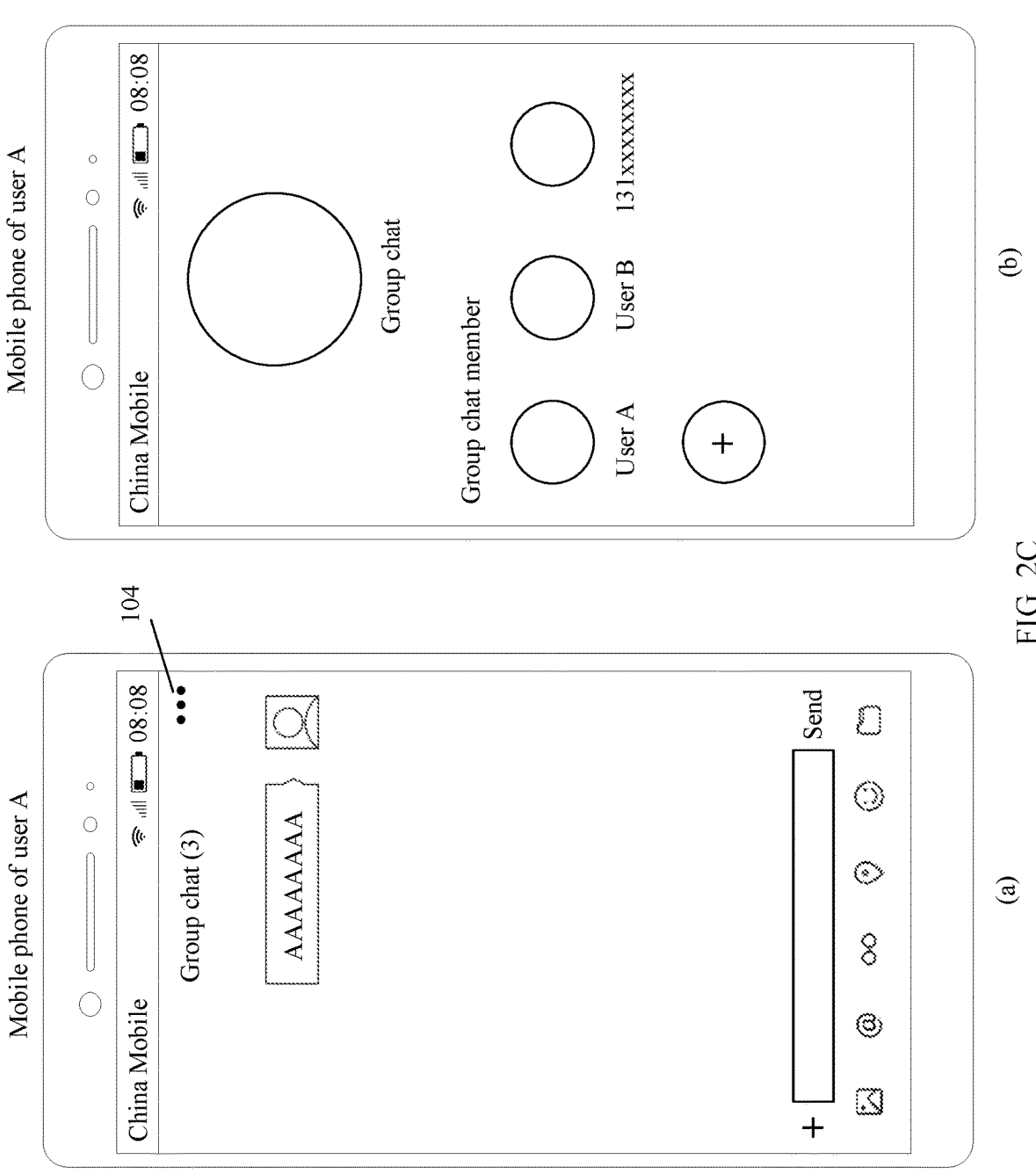

For example, the group includes user A, user B, and user C. A mobile phone of user A is used as an example. (a) in FIG. 2C is a schematic diagram of a chat interface of the group on the mobile phone of user A. It is assumed that the mobile phone detects an operation on a control 104, and the mobile phone displays an interface shown in (b) in FIG. 2C. The interface includes information about group members in the group. Because user C is not in a mobile phone address book of user A, a phone number of user C is displayed in plaintext, that is, "131xxxxxxxx". In this case, the phone number of user C is directly exposed to user A. User A may make a call or send an SMS message to the phone number of user C, causing harassment.

Figure 2D:
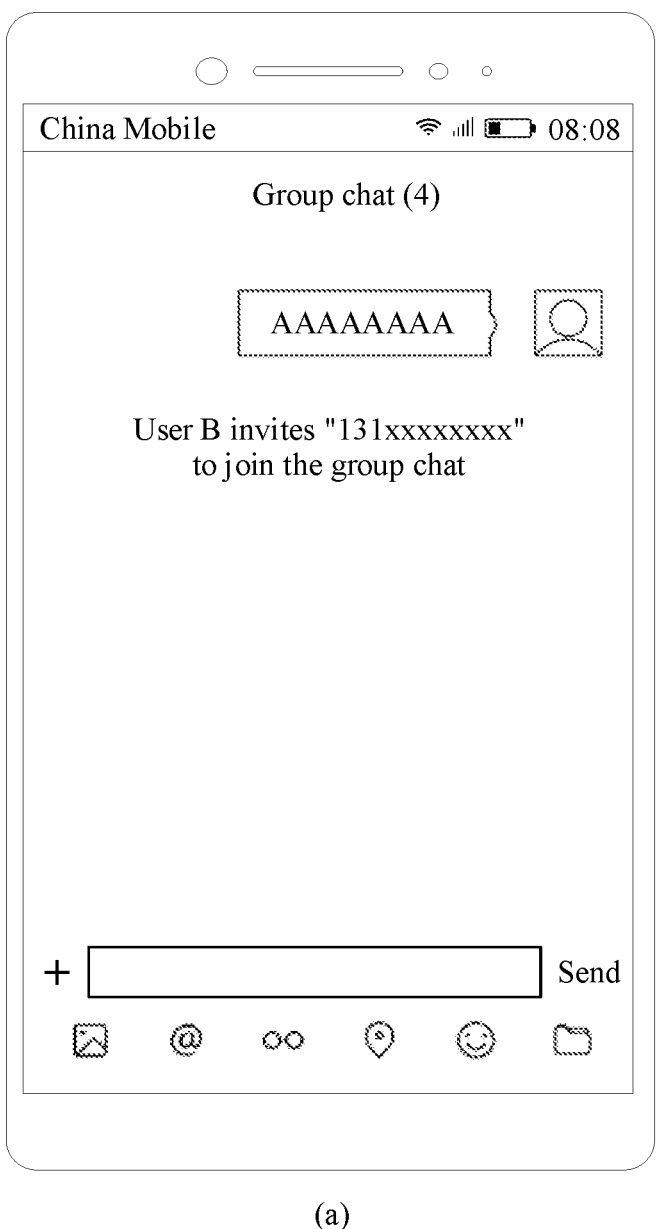

For another example, when user B in the group invites a contact, that is, user D (it is assumed that a mobile phone number is 131xxxxxxxx) in a mobile phone address book of user B to the group chat, a group chat interface shown in FIG. 2D may be displayed. The group chat interface includes prompt information: User B invites "131xxxxxxxx" to join the group chat. In this case, the mobile phone number 131xxxxxxxx of user D is directly exposed to all persons in the group.

It can be learned that, in this manner of displaying a mobile phone number of a group member in plaintext, the mobile phone number of the group member is easily exposed. Consequently, the group member may be harassed, and user experience is relatively low.

In view of this, this application provides a method for protecting privacy of a group member in a group. The method can protect privacy information (for example, a mobile phone number) of a group member from being exposed.

MeeTime is used as an example. For example, user A, user B, and user C all have been registered with MeeTime, and have uploaded profile pictures and nicknames. It is assumed that user A, user B, and user C are in a same group. If user C is not in user A's mobile phone address book, user A cannot view user C's mobile phone number and can view only user C's nickname and/or profile picture. This prevents user C's mobile phone number from being exposed to user A.

In this manner, a mobile phone number of a group member can be prevented from being leaked to a stranger in the group, and SMS message harassment or call harassment caused by a leakage of the mobile phone number can be avoided, thereby ensuring high security.

In the following embodiments, the method for protecting privacy of a group member in a group provided in the embodiments of this application is described in detail with reference to the accompanying drawings.

Figure 2E:
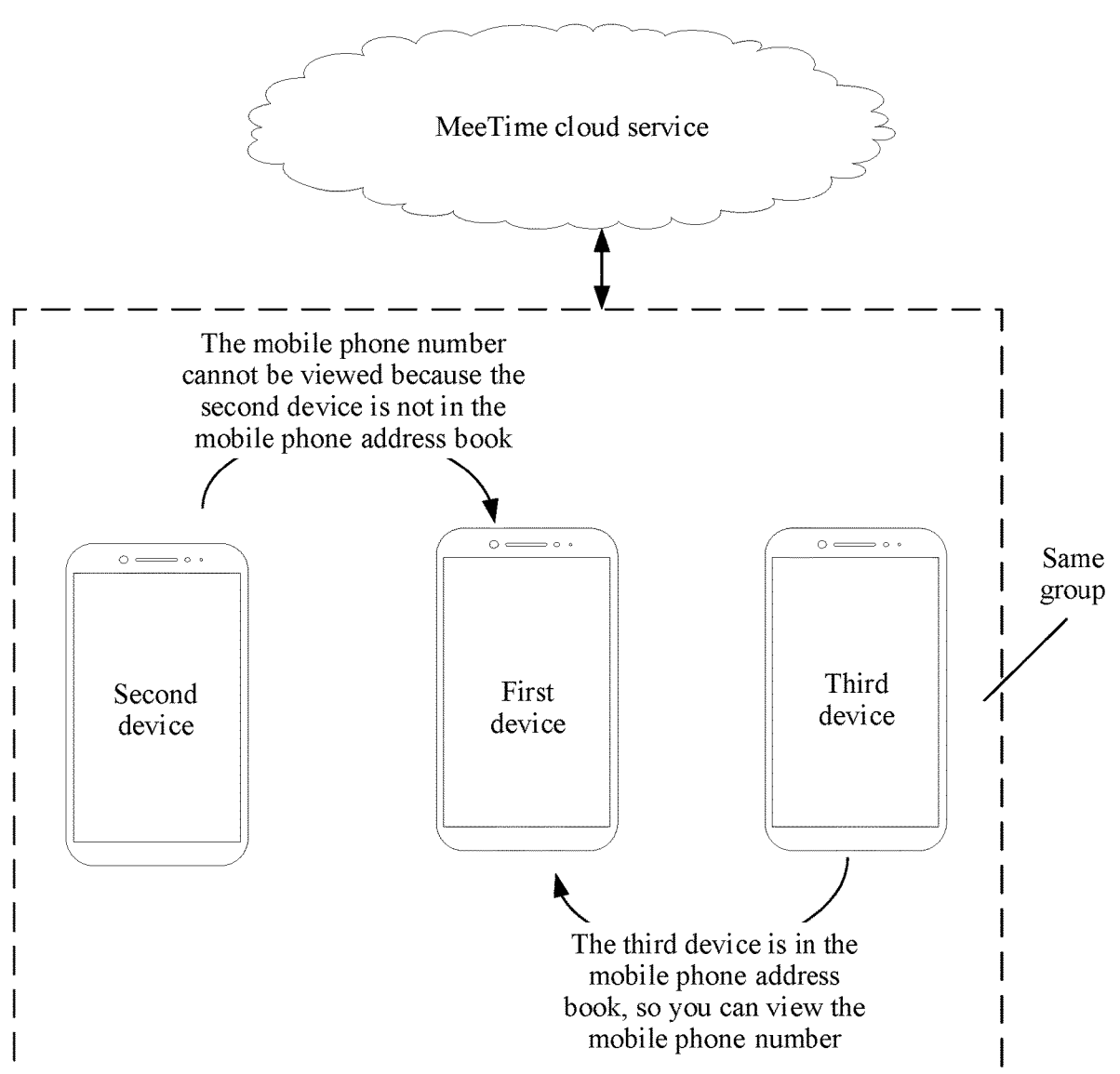
FIG. 2E is a schematic diagram of an application scenario according to an embodiment of this application.

The method for protecting privacy of a group member in a group provided in this application is applicable to a system including a plurality of devices. FIG. 2E is a schematic diagram of a system according to this application. The system includes a first device, a second device, a third device, and a MeeTime cloud service. For hardware structures of the first device, the second device, and the third device, refer to FIG. 1A. For software structures, refer to FIG. 1B. Types of the three devices may be the same. For example, the three devices are all mobile phones or tablet computers. Alternatively, types of the three devices may be different. For example, the first device and the second device are mobile phones, and the third device is a tablet computer. In conclusion, the types of the three devices are not limited in this embodiment of this application.

For example, a phone number of the first device is a first number, a phone number of the second device is a second number, and a phone number of the third device is a third number. In addition, an instant messaging application based on a mobile phone number, for example, HUAWEI Mee-Time, is installed on each of the first device, the second device, and the third device. The first device registers with the MeeTime cloud service based on the first number and uploads a first nickname and a first profile picture. The second device registers with the MeeTime cloud service based on the second number and uploads a second nickname and a second profile picture. The third device registers with the MeeTime cloud service based on the third number and uploads a third nickname and a third profile picture. Therefore, three users are recorded on the MeeTime cloud service, namely the first user, the second user, and the third user, which are respectively as follows:

first user: first number, first nickname, and first profile picture;

second user: second number, second nickname, and second profile picture;

third user: third number, third nickname, and third profile picture.

It is assumed that the three users are in a same group. If the second number is not in a mobile phone address book of the first user, when the first device views information about the second user in the group, the second number of the second user cannot be viewed, and only the second nickname and/or the second profile picture of the second user can be viewed. If the first user wants to communicate with the second user, the first user may send a contact adding request; and add the second number of the second user to the mobile phone address book of the first user with the consent of the second user, and then communicate with the second user. If the third number of the third user is in the mobile phone address book of the first user, when the first device views information about the third user in the group, the third number of the third user may be seen, and the first user may directly communicate with the third user by using the third number, without adding a contact.

The following uses the system shown in FIG. 2E as an example for description. In addition, an example in which the first device, the second device, and the third device are all mobile phones, and MeeTime is installed in the three mobile phones is used. For ease of description, it is assumed that user relationships of the three devices are as follows:

The user of the first device is Amy, the first nickname is AAA, and the first number is 185 xxxx xxxx;

the user of the second device is David, the second nickname is DW, and the second number is 156 xxxx xxxx; and the user of the third device is Tom, the third nickname is flower, and the third number is 138 xxxx xxxx.

Specifically, Embodiment 1 to Embodiment 5 are included. Embodiment 1 describes a registration process of MeeTime; Embodiment 2 describes a process of establishing a group in MeeTime; and Embodiment 3 to Embodiment 5 each describe an implementation process of chatting between two group members in a group.

Embodiment 1

Embodiment 1 describes a registration process of Mee-Time. It should be noted that, during registration of a current second-type instant messaging application, a profile picture and a nickname do not need to be uploaded, and a user directly performs registration based on a mobile phone number. Therefore, a cloud side uses mobile phone numbers to distinguish different users. When a group is established on the cloud side, mobile phone numbers of group members are sent to the group to identify different group members, which causes exposure of the mobile phone numbers of the group members.

In Embodiment 1, when a user registers with MeeTime based on a mobile phone number, a nickname, a profile picture, and the like need to be uploaded. Therefore, the cloud side knows a mobile phone number of each registered user, and further knows a nickname and a profile picture of each registered user. Therefore, nicknames and/or profile pictures may be used to mark different users. When a group is established, nicknames and/or profile pictures may be used to identify different group members, so as to avoid directly exposing phone numbers of group members.

The accompanying drawings involved in Embodiment 1 include FIG. 3A to FIG. 4B(d).

Figure 3A:
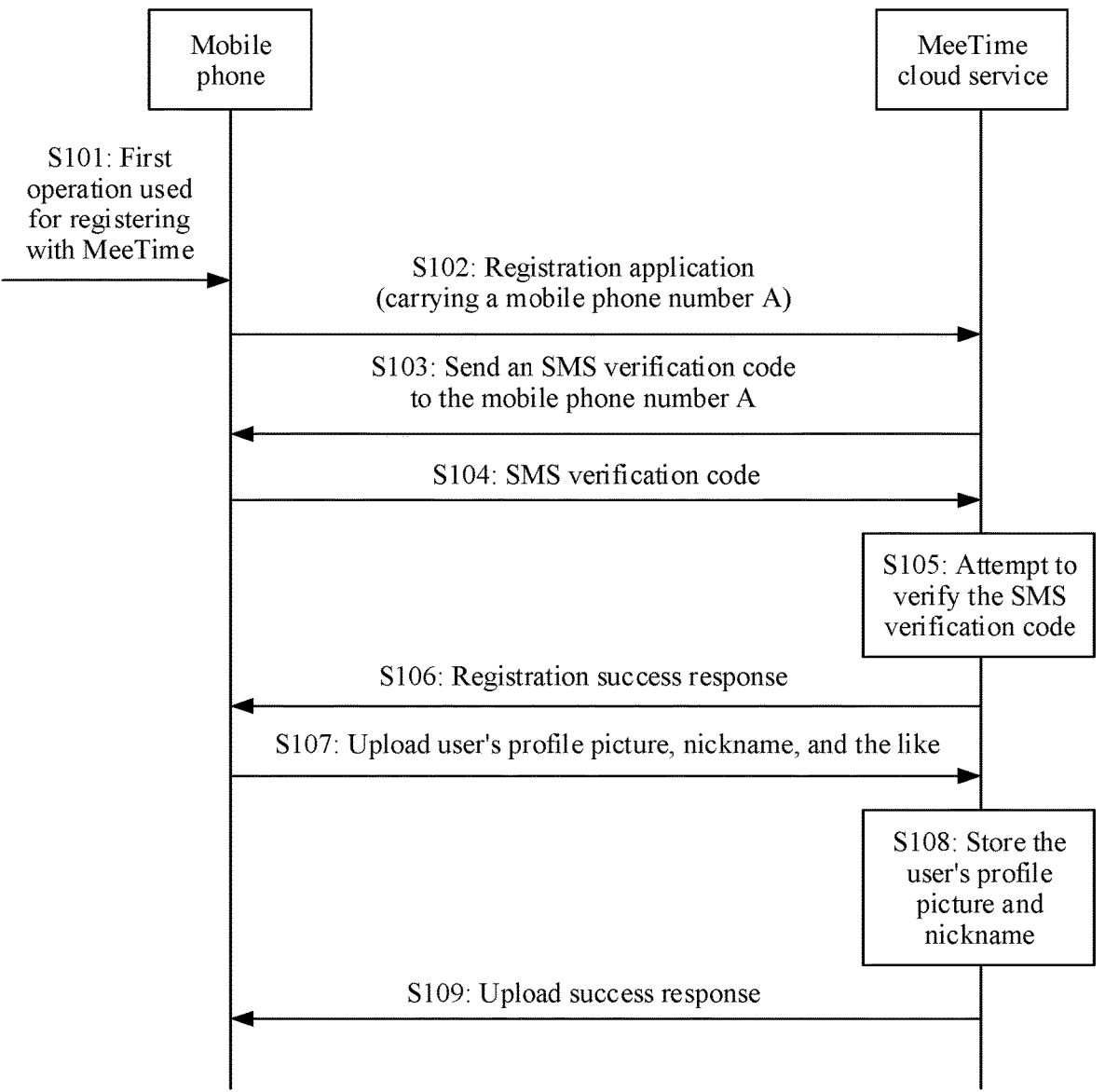
FIG. 3A is a schematic diagram of a registration procedure of an instant messaging application according to an embodiment of this application.

FIG. 3A is a schematic diagram of a registration procedure of MeeTime. As shown in FIG. 3A, the procedure includes the following steps.

S101: A mobile phone receives a first operation used for registering with MeeTime.

Figure 3B:
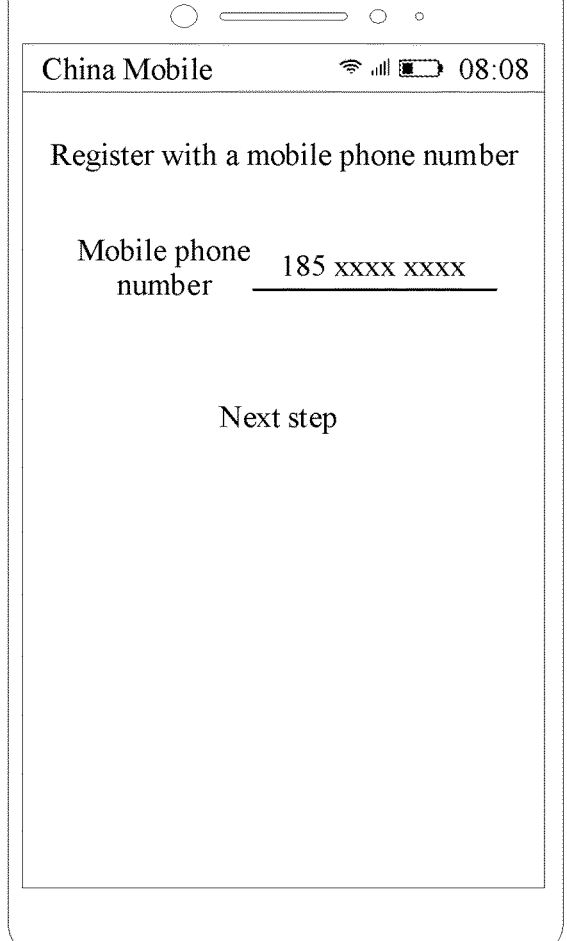
FIG. 3B(a) to FIG. 3B(d) and FIG. 3C(a) to FIG. 3C(e) are schematic diagrams of GUIs in a registration process of an instant messaging application according to an embodiment of this application.
Figure 3B:
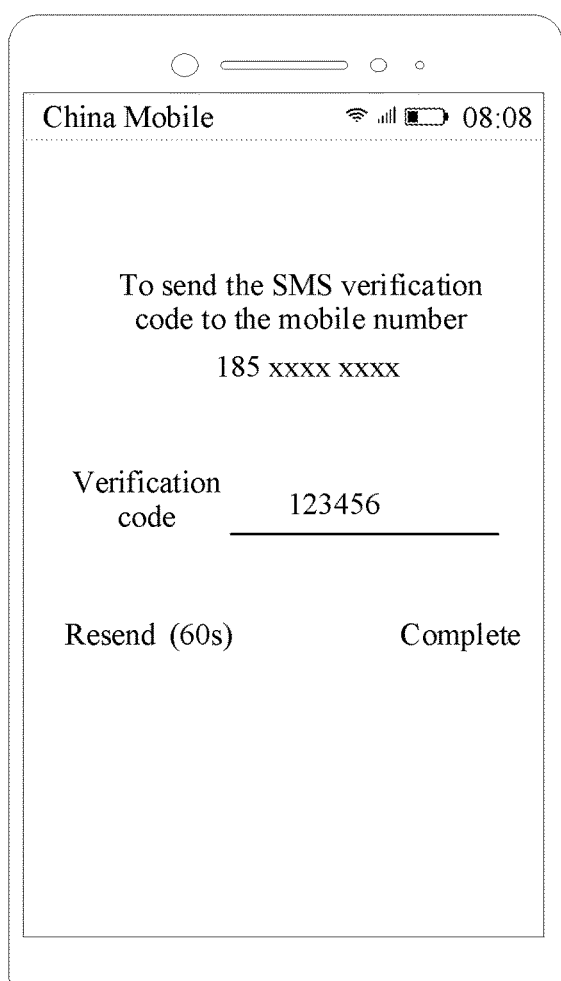

For example, FIG. 3B(a) shows a graphical user interface (graphical user interface, GUI) of the mobile phone. The GUI is a home screen (home screen) of the mobile phone. The home screen includes icons of a plurality of applications, for example, an icon of a Camera application, an icon of Application market, and an icon of MeeTime. When detecting an operation on the icon of MeeTime, the mobile phone displays another GUI shown in FIG. 3B(b). The GUI may be referred to as a login interface of MeeTime. The login interface displays a mobile phone number input box and a password input box. A user can enter a mobile phone number and a password into the mobile phone number input box and the password input box to log in. It may be understood that, if MeeTime is used for the first time, registration may be performed first. For example, still refer to FIG. 3B(b). When detecting an operation of tapping a "Registration" control by the user, the mobile phone displays an interface shown in FIG. 3B(c). The interface includes a mobile phone number input box, and the user may enter a mobile phone number in the input box, for example, 185 xxxx xxxx. The foregoing first operation may be an operation of tapping a "Next" control in the interface shown in FIG. 3B(c); or the first operation may be an operation of another type, for example, a voice instruction used for instructing to register with MeeTime. This is not limited in this embodiment of this application.

S102: The mobile phone sends a registration application to a MeeTime cloud service.

The registration application may carry the mobile phone number of the user, for example, the mobile phone number 185 xxxx xxxx in FIG. 3B(c).

S103: The mobile phone receives an SMS verification code sent by the MeeTime cloud service.

After receiving the registration application sent by the mobile phone, the MeeTime cloud service sends the SMS verification code to the mobile phone number carried in the registration application. For example, if the mobile phone number carried in the registration application is 185 xxxx xxxx, the MeeTime cloud service sends the SMS verification code, for example, 123456, to the mobile phone number 185 xxxx xxxx. After receiving the verification code, the mobile phone may enter the verification code into a verification code input box. As shown in FIG. 3B(d), the user enters the SMS verification code "123456". When detecting an operation on a "Complete" control, the mobile phone sends the entered SMS verification code to the MeeTime cloud service. Alternatively, the "Complete" control in FIG. 3B(d) may not be displayed. For example, after it is detected that entering of the verification code is completed (for example, the verification code is six digits, and it is detected that the user has entered six digits to confirm input completion), the entered SMS verification code is sent to the MeeTime cloud service by default.

S104: The mobile phone sends the SMS verification code to the MeeTime cloud service.

S105: The MeeTime cloud service attempts to verify the SMS verification code.

For example, after S103 is performed, the MeeTime cloud service records that the SMS verification code 123456 is sent to the mobile phone number 185xxxxxxxx. After receiving the SMS verification code from the mobile phone number 185xxxxxxxx, the MeeTime cloud server may attempt to verify the SMS verification code, for example, determine whether the received SMS verification code is consistent with the sent SMS verification code. If yes, the verification succeeds; otherwise, the verification fails. Optionally, to improve security, in addition to determining whether the received SMS verification code is consistent with the sent SMS verification code, it may be further determined whether a time difference between a receiving time of the SMS verification code and a sending time of the SMS verification code is less than preset duration. If yes, the verification succeeds; otherwise, the verification fails. After the verification succeeds, the MeeTime cloud service may send a registration success response to the mobile phone. Certainly, when the verification fails, the MeeTime cloud service may send a registration failure response to the mobile phone.

S106: The MeeTime cloud service sends the registration success response to the mobile phone.

After the registration based on the mobile phone number is successful, the user may further set a profile picture, a nickname, and the like of MeeTime. FIG. 3A is still used as an example, and a specific procedure includes S107 and S108.

S107: The mobile phone uploads information such as a profile picture and a nickname of the user.

S108: The MeeTime cloud service stores the information such as the profile picture and the nickname of the user.

Figure 3C:
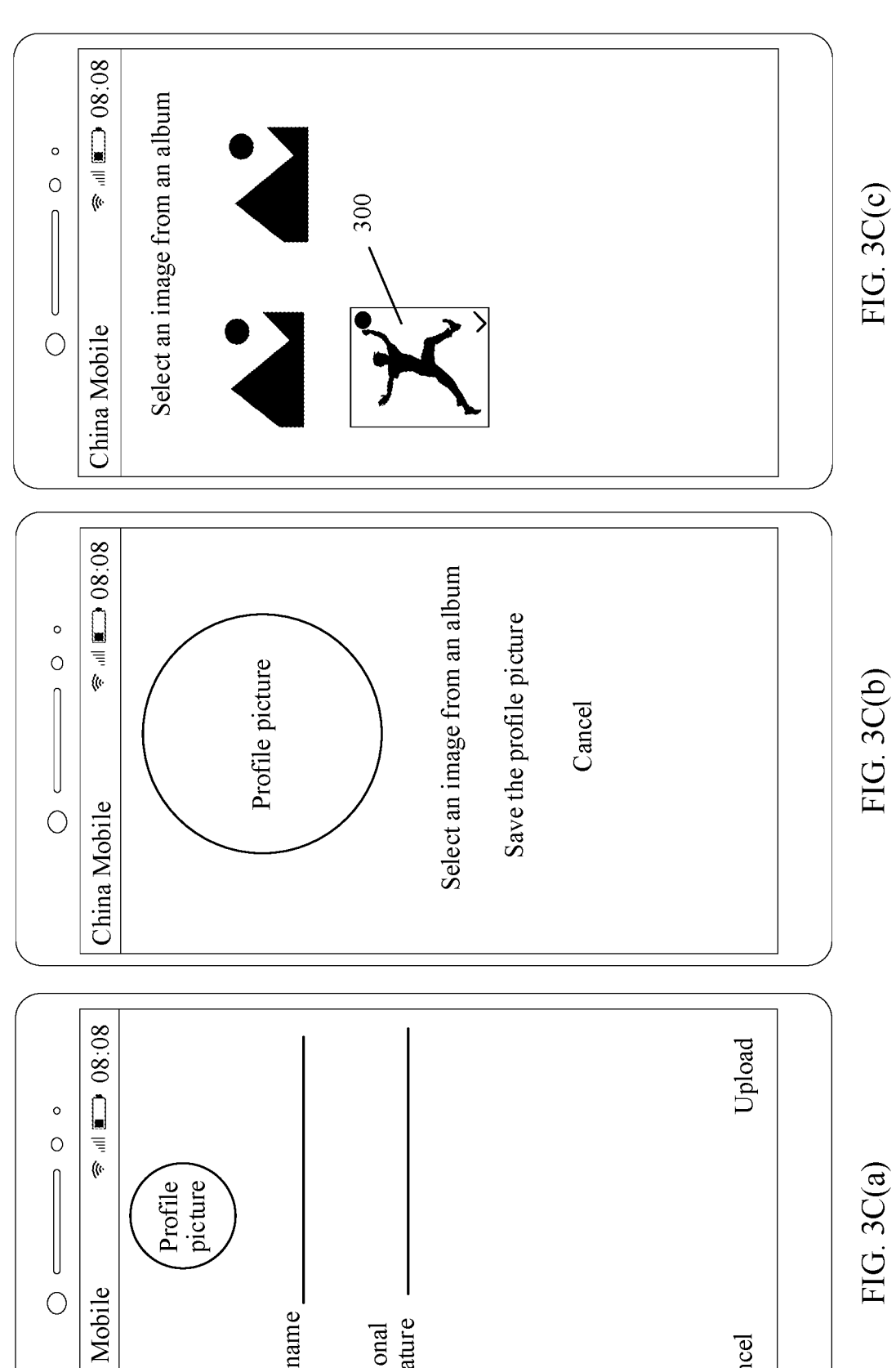
Figure 3C:
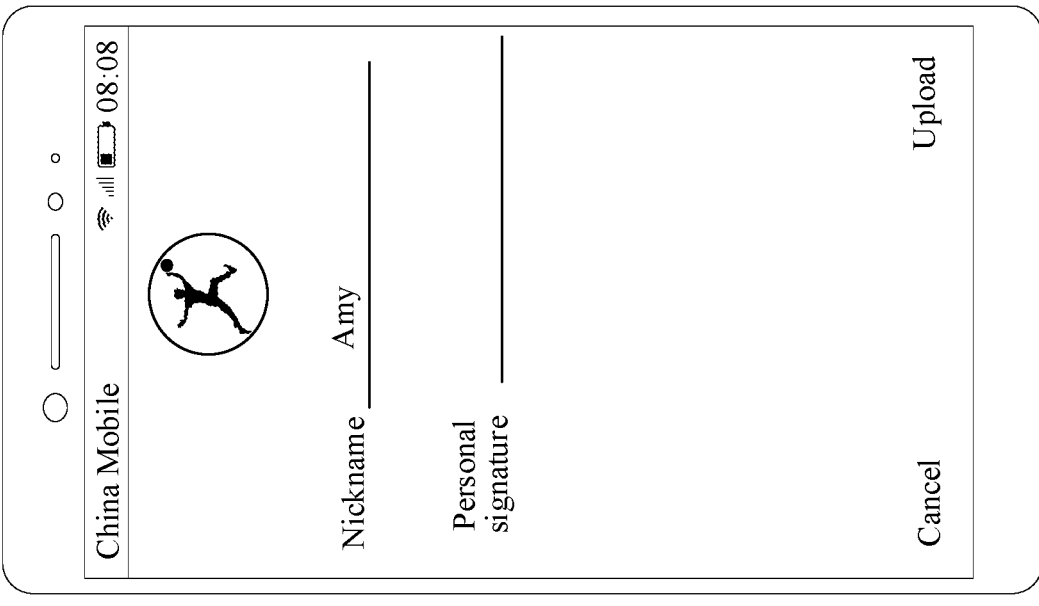
Figure 3C:
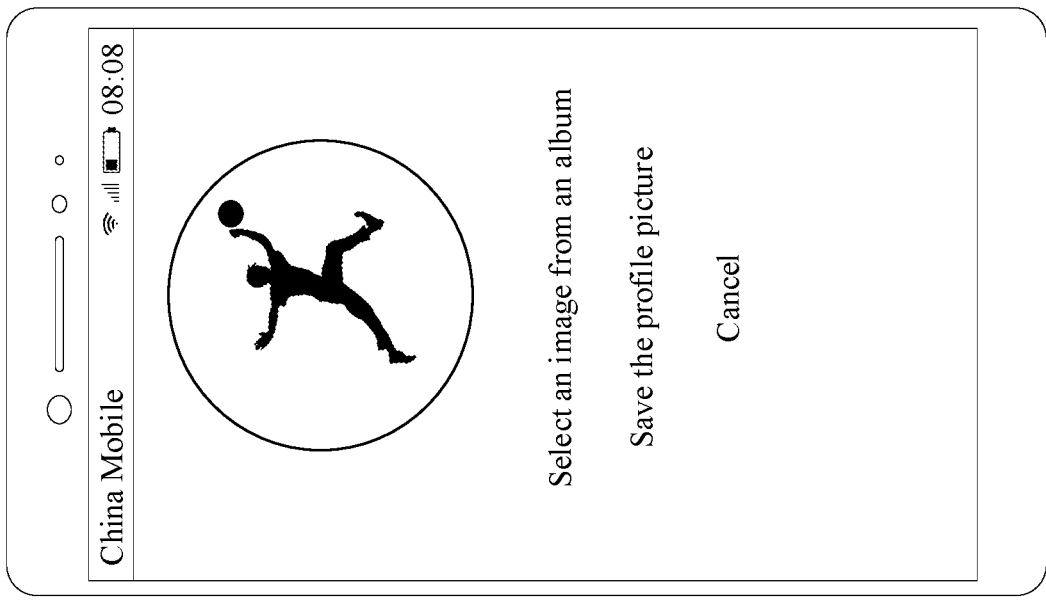

For example, after the registration is completed, the mobile phone displays an interface shown in FIG. 3C(a), and the interface displays a default profile picture and a nickname input box. When detecting an operation of tapping the default profile picture by the user, the mobile phone may display an interface shown in FIG. 3C(b), and the interface includes a "Select an image from an album" control. When detecting an operation on the "Select an image from an album" control, the mobile phone opens the album. As shown in FIG. 3C(c), the user may select an image from the album as a profile picture, for example, select an image 300. After selecting the image, the mobile phone displays an interface shown in FIG. 3C(d), and the displayed profile picture in the interface is the image 300 selected by the user. When the mobile phone detects an operation on a "Save as the profile picture" control, an interface shown in FIG. 3C(e) is displayed. The profile picture displayed in the interface is the image 300 selected by the user. It is assumed that the user enters a nickname: Amy. When the mobile phone detects an operation of tapping the "Upload" control by the user, information such as the profile picture and the nickname is uploaded to the MeeTime cloud service.

Optionally, the interface shown in FIG. 3C(e) further includes a personal signature input box, and the user may enter a personal signature of the user in the input box, and upload the personal signature to the MeeTime cloud service.

It should be noted that FIG. 3B(a) to FIG. 3B(d) and FIG. 3C(a) to FIG. 3C(e) are a process in which the user registers with MeeTime based on the mobile phone number (for example, 185 xxxx xxxx) of the user by using the mobile phone of the user. It may be understood that a plurality of users may use their mobile phone numbers to register with MeeTime, and a registration principle is the same as the foregoing principle. In other words, the MeeTime cloud service can store a large quantity of registered users. For example, refer to Table 1. Table 1 is an example of registered users stored in the MeeTime cloud service.

TABLE 1

| Mobile phone number | Profile picture | Nickname |
|---|---|---|
| 185 xxxx xxxx | Image 1 | AAA |
| 156 xxxx xxxx | Image 2 | DW |
| 138 xxxx xxxx | Image 3 | YH |
| 131 xxxx xxxx | Image 4 | flower |

That is, in addition to a first user (for example, 185 xxxx xxxx), a second user whose mobile phone number is 156 xxxx xxxx, a third user whose mobile phone number is 138 xxxx xxxx, and a fourth user whose mobile phone number is 131 xxxx xxxx have registered with HUAWEI MeeTime and uploaded profile pictures.

In the foregoing embodiment, the registration procedure is described by using MeeTime as an example. It should be noted that the registration procedure is also applicable to another instant messaging application. This is not limited in this embodiment of this application.

S109: The MeeTime cloud service sends an upload success response to the mobile phone.

Optionally, after the mobile phone registers with MeeTime, it may be found that which contacts in the address book of the mobile phone register with MeeTime. For example, the mobile phone address book of the first user includes 100 contacts, where 50 persons may have registered with MeeTime. In this case, the mobile phone of the first user may mark, in a specific manner, the contacts that have registered with MeeTime. In an implementation, the mobile phone of the first user sends the mobile phone address book of the first user to the MeeTime cloud service. The MeeTime cloud service knows each mobile phone number that has registered with MeeTime. Therefore, after receiving the mobile phone address book of the first user, the MeeTime cloud service may determine a user who has registered with MeeTime in the mobile phone address book. Therefore, the MeeTime cloud service may indicate, in a specific indication manner, the user who has registered with MeeTime in the mobile phone address book of the first user.

Figure 4A:
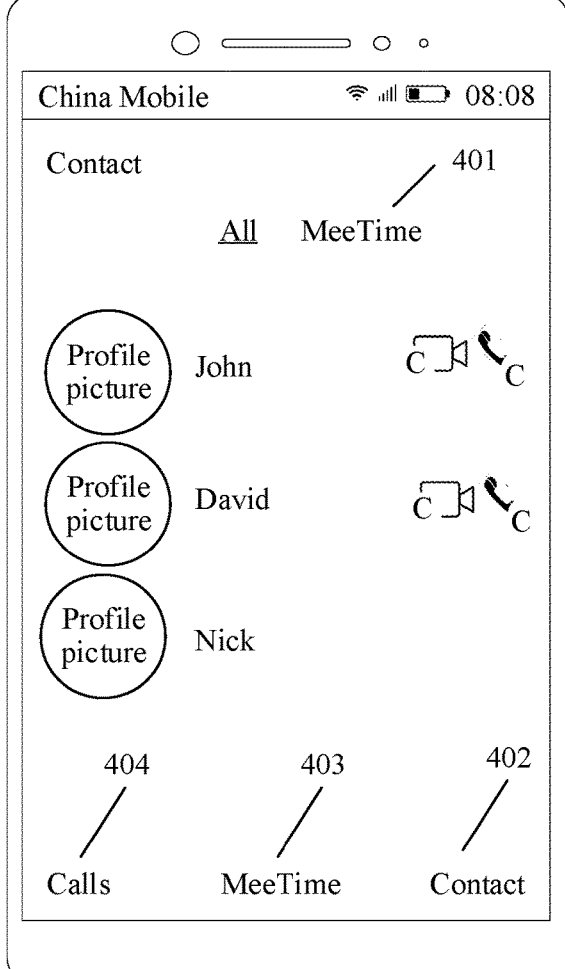
FIG. 4A(a) to FIG. 4A(d) and FIG. 4B(a) to FIG. 4B(d) are schematic diagrams of related GUIs of an instant messaging application according to an embodiment of this application.
Figure 4A:
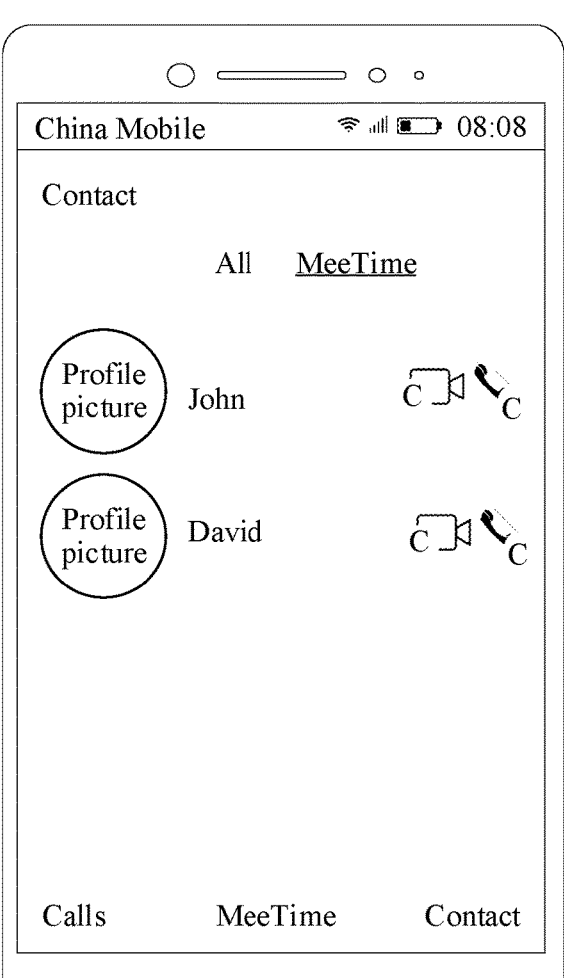
Figure 4A:
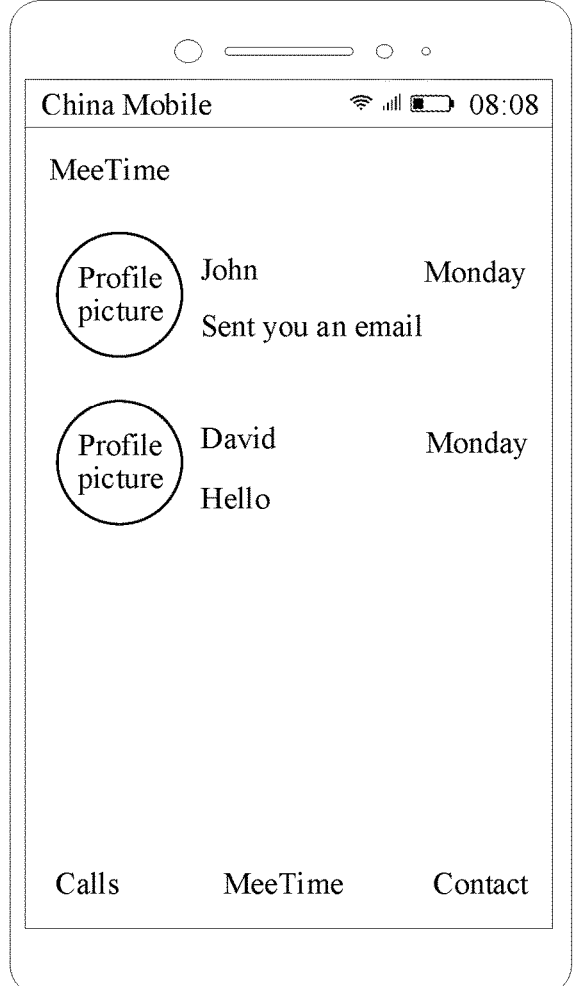
Figure 4A:
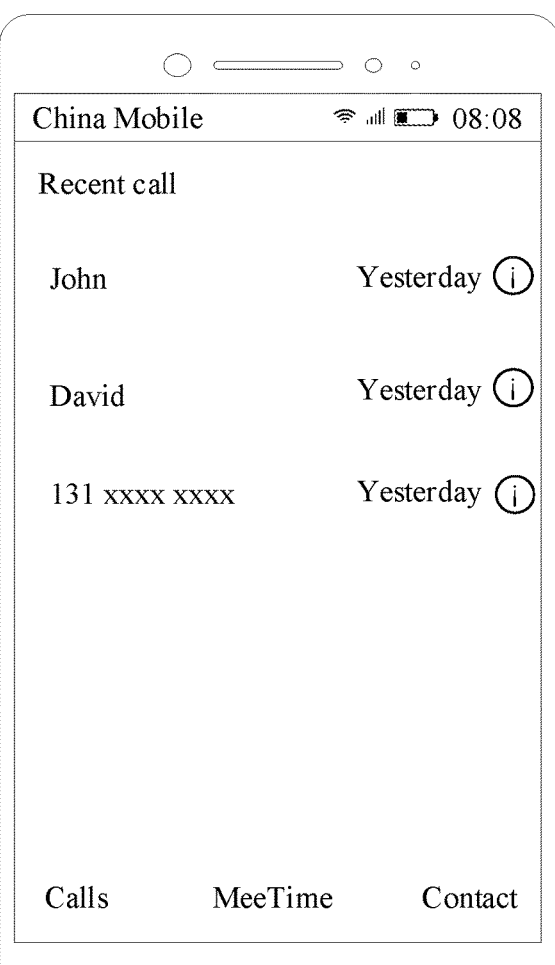

For example, refer to FIG. 4A(a). FIG. 4A(a) is a schematic diagram of an interface of MeeTime in the mobile phone of the first user. The interface includes a Contact option 402, a MeeTime option 403, and a Call option 404. When the Contact option 402 is selected, the mobile phone displays the address book including contacts, for example, John, David, and Nick. John and David have registered with MeeTime, and therefore the contact John and the contact David in FIG. 4A(a) each display corresponding MeeTime marks, for example, a MeeTime video mark and a MeeTime voice mark. The contact Nick has not registered with Mee-Time, and therefore no MeeTime icon is displayed for the contact Nick in the interface.

Optionally, the mobile phone may alternatively filter out, from the mobile phone address book, contacts that have registered with MeeTime, so as to facilitate search by the user. For ease of description, the contacts that are filtered out from the mobile phone address book and that have registered with MeeTime are collectively referred to as a MeeTime address book. In other words, the mobile phone address book includes all contacts stored in the mobile phone, and the MeeTime address book includes contacts that have registered with MeeTime in the mobile phone address book. Simply speaking, the MeeTime address book is a subset of the mobile phone address book. It may be understood that, the MeeTime address book may be updated in real time. For example, after a contact in the mobile phone address book of the first user registers with MeeTime, the MeeTime cloud service notifies the mobile phone of the first user. Correspondingly, the contact is added to the MeeTime address book in the mobile phone of the first user.

For example, still refer to FIG. 4A(a). When the mobile phone detects an operation of selecting a "MeeTime" button 401 by the user, an interface shown in FIG. 4A(b) is displayed. The interface displays a MeeTime address book, that is, displays contacts that have registered with MeeTime. Because the contact Nick has not registered with MeeTime, the contact Nick is not displayed in the interface.

The foregoing describes a display interface of the mobile phone displayed when the Contact option 402 in FIG. 4A(a) is selected. FIG. 4A(a) further includes the MeeTime option 403 and the Call option 404. When the MeeTime option 403 is selected, the mobile phone may display an interface shown in FIG. 4A(c), and the interface displays messages sent to each other with contacts John and David. When the Call option 404 is selected, the mobile phone displays an interface shown in FIG. 4A(d). The interface includes a call record, for example, calls with John, David, and another person yesterday.

FIG. 4A(a) is still used as an example. If the user wants to chat with John in the mobile phone address book alone, three manners may be used: a MeeTime video call, a MeeTime voice call, and a MeeTime message.

Figure 4B:
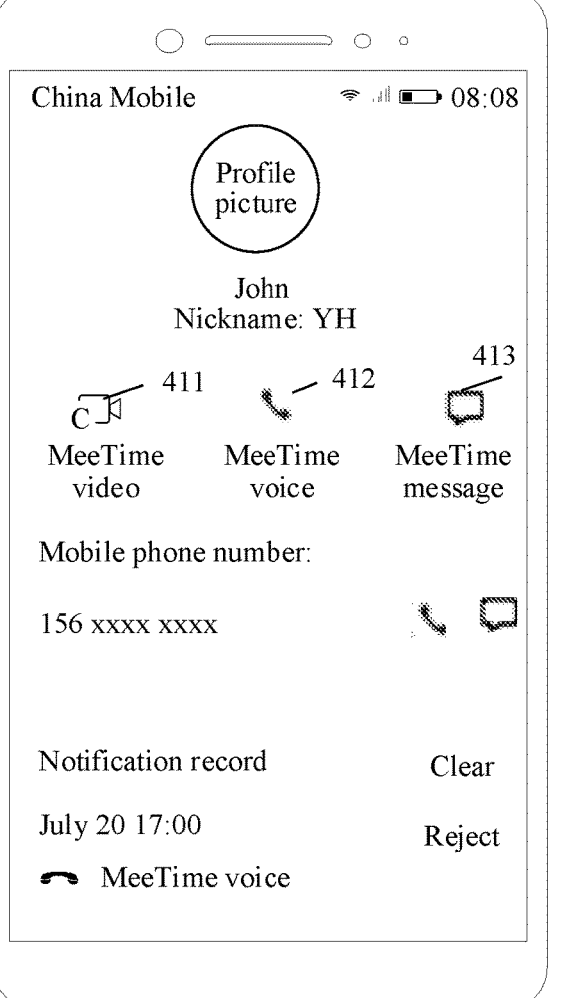
Figure 4B:
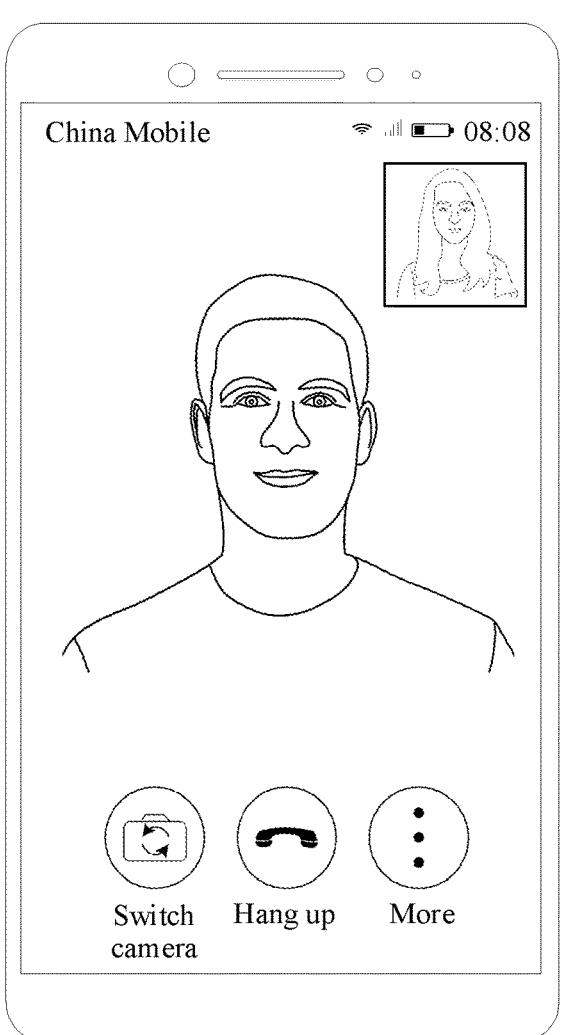
Figure 4B:
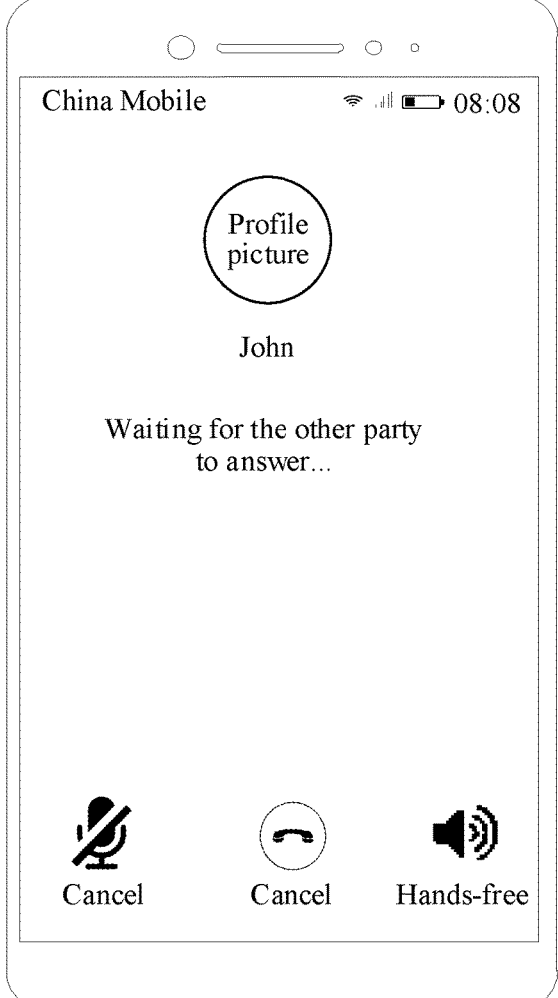
Figure 4B:
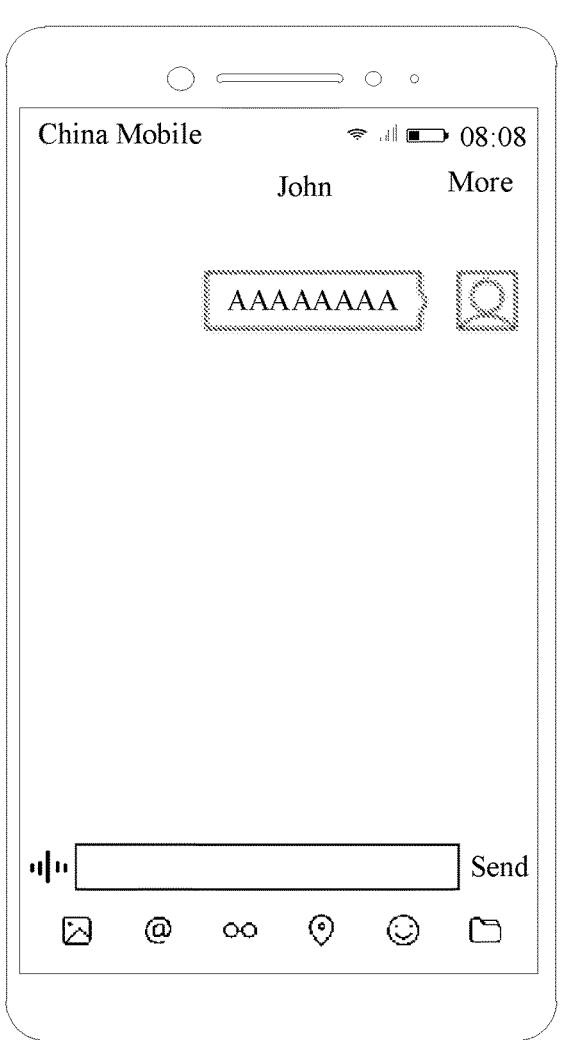

For example, as shown in FIG. 4A(a), the user may initiate a call to John by using a MeeTime video mark and a MeeTime voice mark corresponding to the contact John that are in the interface shown in FIG. 4A(a). Alternatively, a call may be initiated to John in another manner. For example, as shown in FIG. 4A(a), when detecting that the user taps the profile picture of John or the name of John, the mobile phone may display an interface shown in FIG. 4B(a). The interface includes related information of John, such as the profile picture and a nickname. The interface further includes a MeeTime video mark 411, a MeeTime voice mark 412, and a MeeTime message mark 413. If the mobile phone detects that the user taps the MeeTime video mark 411, a MeeTime video call is initiated to John, for example, as shown in FIG. 4B(b). If the mobile phone detects that the user taps the MeeTime voice mark 412, a MeeTime voice call is initiated to John, for example, as shown in FIG. 4B(c). If the mobile phone detects that the user taps the MeeTime message mark 413, an interface shown in FIG. 4B(d) may be displayed. The interface may be understood as a chat interface with John. In the chat interface, the user may send a text, a picture, a location, an emoji, and the like to John.

Embodiment 2

Figure 5A:
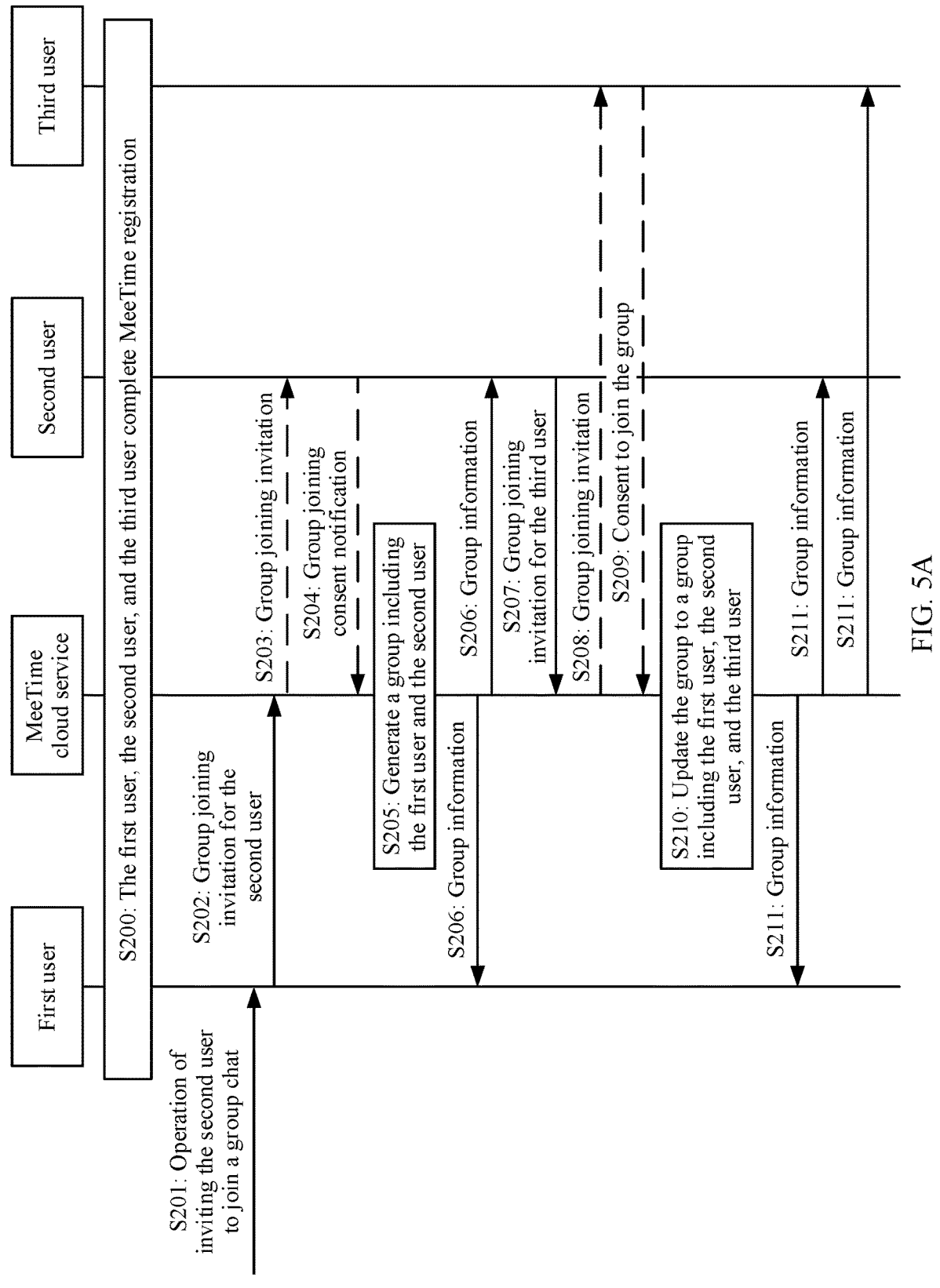
FIG. 5A is a schematic diagram of a procedure of creating a group in an instant messaging application according to an embodiment of this application.

Embodiment 2 describes a process of establishing a group in MeeTime. Accompanying drawings involved in Embodiment 2 include FIG. 5A to FIG. 5D. FIG. 5A is a schematic flowchart of establishing a group. Specifically, S201 to S206 are a process in which a first user invites a second user to join a group, and S206 to S211 are a process in which the second user invites a third user to join the group. When a user invites another user to join a group, a new member joining prompt is displayed on a mobile phone of a group member, so as to prompt that the new member joins the group. It can be known from FIG. 2D that, in a new member joining prompt displayed by a current second-type instant messaging application, a mobile phone number of an inviter and/or a mobile phone number of an invitee are displayed in plaintext. In Embodiment 2, a nickname of an inviter and/or a nickname of an invitee are displayed in a new member joining prompt, so as to avoid direct exposure of a mobile phone number of the inviter and/or a mobile phone number of the invitee.

FIG. 5A is a schematic flowchart of establishing a group. As shown in FIG. 5A, the procedure includes the following steps.

S200: A first user, a second user, and a third user complete MeeTime registration. For the registration process, refer to Embodiment 1, which is not repeated herein.

S201: The first user detects an operation used for inviting the second user to join a group chat.

For example, a mobile phone of the first user displays an interface shown in (a) in FIG. where the interface includes a control 501. When an operation on the control 501 is detected, an interface shown in (b) in FIG. 5B is displayed, where the interface includes contacts in a MeeTime address book, and the user may select, from the MeeTime address book, a contact to be invited to a group. For example, the user selects a contact David (that is, the second user), and when the mobile phone detects an operation of tapping the "OK" control by the user, David is invited to join the chat.

In the foregoing, that the group is established by using the control 501 is used as an example. It may be understood that the group may alternatively be established in another manner, for example, creating a group face to face, or inviting another contact to join in a separate chat interface with a contact, which is not limited in this embodiment.

S202: The first user sends a group joining invitation of the second user to a MeeTime cloud service. The group joining invitation may carry a mobile phone number of the second user, and optionally, may further carry information such as a nickname and a profile picture of the second user.

S203: The MeeTime cloud service sends a group joining invitation to the second user.

Figure 5C:
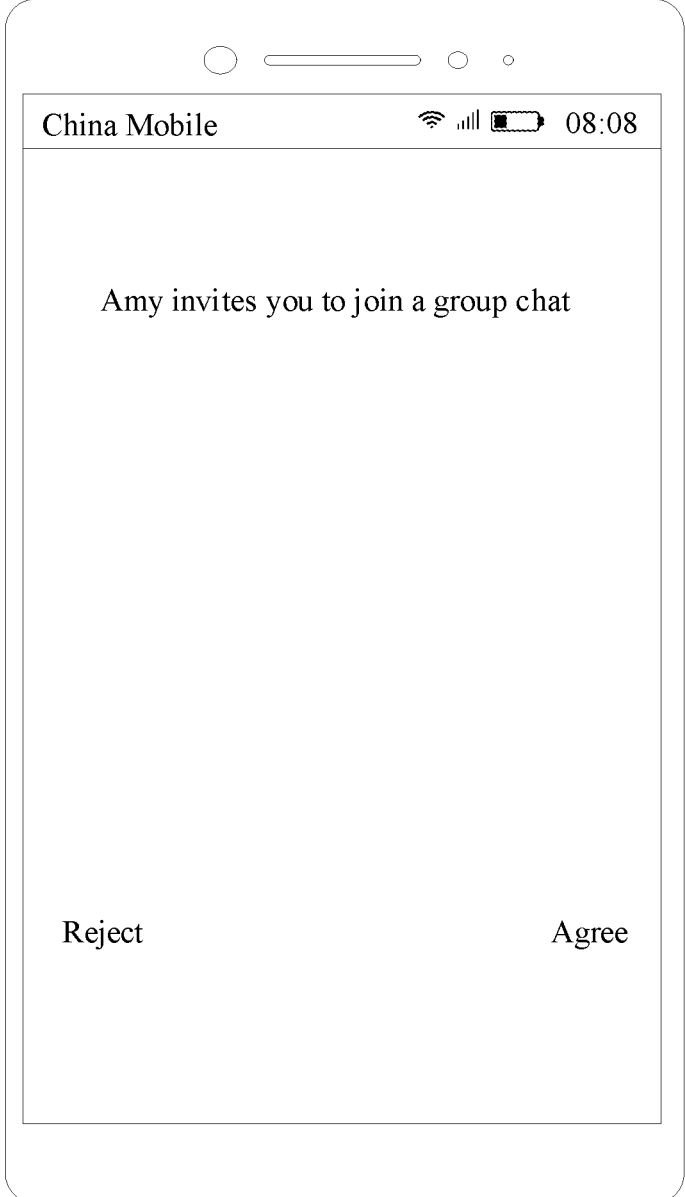
FIG. 5C is a schematic diagram of a GUI of a user invited to a group according to an embodiment of this application.

Optionally, refer to FIG. 5C. FIG. 5C is a schematic diagram of a display interface of the second user. The interface displays prompt information: Amy invites you to join a group chat. When an operation on an "Agree" button is detected, a notification indicating that the second user agrees to join the group is sent to the MeeTime cloud service. When an operation on a "Reject" control is detected, a notification indicating that the second user rejects to join the group is sent to the MeeTime cloud service.

S204: The MeeTime cloud service receives a notification from the second user indicating that the second user agrees to join the group.

Optionally, S203 and S204 may be performed or not performed (which is indicated by using dashed lines in FIG. 5A). For example, when S203 and S204 are not performed, the cloud service directly adds the second user to the group without consent of the second user.

S205: The MeeTime cloud service generates a group including the first user and the second user.

S206: The MeeTime cloud service sends group information to the first user and the second user. The group information may be, for example, a prompt indicating that a new member joins the group, that is, prompt information used to prompt that the second user joins the group.

For example, still as shown in (b) in FIG. 5B, after the first user invites David to join the group, an interface shown in (c) in FIG. 5B is displayed on the mobile phone of the first user, and the interface displays a prompt that a new member joins the group: You invite "David" to join the group chat, that is, the group includes the first user (Amy) and the second user (David).

Optionally, after the first user adds the second user to the group chat, the second user may also add a contact, for example, the third user, in a MeeTime address book of the second user to the group. Specifically, a process in which the second user adds the third user to the group chat includes S206 to S211.

S207: The second user sends a group joining invitation for the third user to the MeeTime cloud service. The third user is a contact in the MeeTime address book of the second user.

S208: The MeeTime cloud service sends a group joining invitation to the third user.

S209: The MeeTime cloud service receives an indication sent by the third user indicating that the third user agrees to join the group.

Optionally, S208 and S209 may be performed or may not be performed (therefore, dashed lines are used for representation in FIG. 5A).

S210: The MeeTime cloud service updates the group including the first user and the second user to a group including the first user, the second user, and a fourth user.

S211: The MeeTime cloud service sends updated group information to the first user, the second user, and the third user. The group information is a prompt indicating that a new member joins the group, for example, may be prompt information used to indicate that the third user joins the group.

Figure 5D:
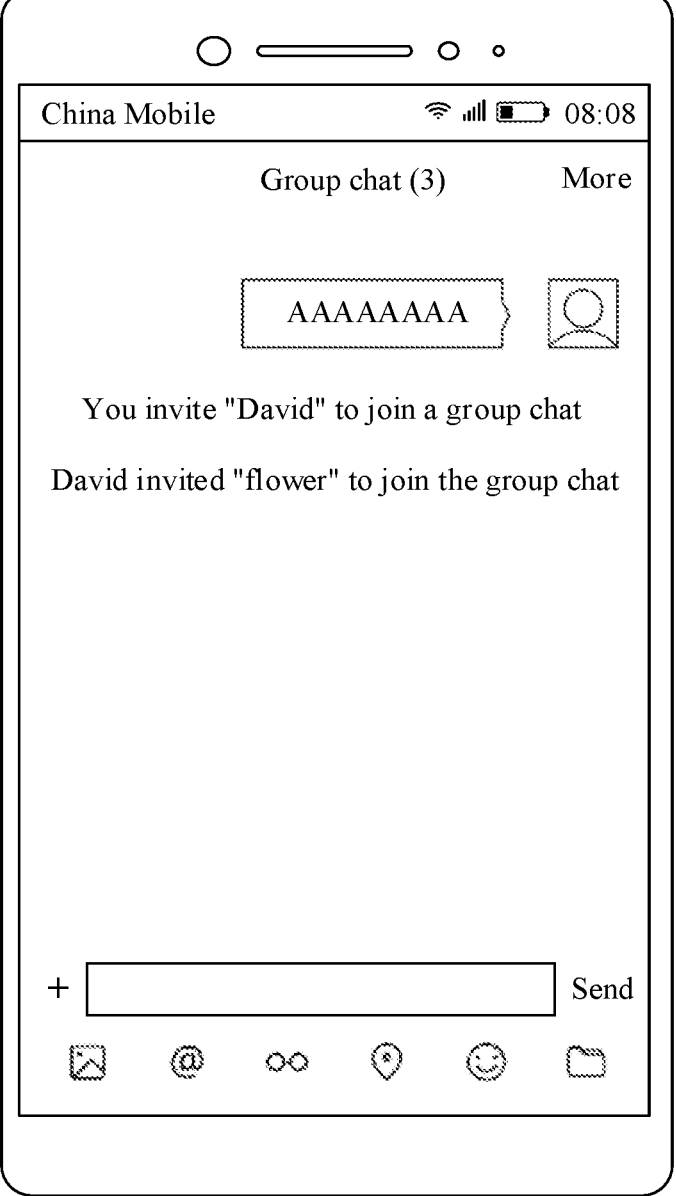
FIG. 5D is a schematic diagram of a GUI displayed after a contact is invited to a group according to an embodiment of this application.

For example, FIG. 5D shows a group chat interface displayed on the mobile phone of the first user. The chat interface includes prompt information: David (that is, the second user) invites "flower" (that is, a nickname of the third user) to join the group chat.

Optionally, a display style of the prompt indicating that the new member joins the group may be: "X" invites "Y" to join the group chat. X is a name of an inviter, and Y is a name of an invitee. X and Y can be displayed in a plurality of formats. For example, a mobile phone of a group member may display the prompt in the following manner:

Manner 1: X is a nickname of an inviter, and/or Y is a nickname of an invitee.

For example, when a group member is neither the inviter nor the invitee, prompt information indicating that the new member joins the group displayed on a mobile phone of the group member is: "X" invites "Y" to join the group chat. Herein, X is a nickname of the inviter, and Y is a nickname of the invitee. For example, in a scenario in which the second user invites the third user to join the group, the first user is neither an inviter nor an invitee. Therefore, prompt information displayed on the mobile phone of the first user may be: "DW" invites "flower" to join the group chat, where DW is a nickname of the second user, and flower is a nickname of the third user. If a group member is an inviter, the mobile phone of the group member displays: "You invite Y to join the group chat". Herein, Y is a nickname of the invitee. If the group member is the invitee, the mobile phone of the group member displays: "X invites you to join the group chat". Herein, X is a nickname of the invitee.

In this manner, the nickname of the inviter and/or the nickname of the invitee are displayed in the prompt indicating that the new member joins the group. Therefore, the mobile phone number of the new member invited to join the group is not directly exposed. This manner has higher user privacy than the manner of directly displaying the mobile phone number of the new member in FIG. 2D.

Manner 2: When a mobile phone address book of a group member includes a mobile phone number of an inviter and a remark is X1, and a mobile phone number of an invitee is not saved, a prompt indicating that the new member joins the group that is displayed on the mobile phone of the group member is: X1 invites Y to join the group chat. In this case, Y is a nickname of the invitee.

For example, continue to use FIG. 5D as an example. The mobile phone address book of the first user stores a mobile phone number of the second user (David) and remarks the mobile phone number of the second user as David, but does not store the mobile phone number of the third user. In this case, a group joining prompt displayed on the mobile phone of the first user is: "David" invites "flower" to join the group chat, where "flower" is a nickname of the third user.

Manner 3: When a mobile phone address book of a group member includes a mobile phone number of an invitee and a remark is Y1, and a mobile phone number of an inviter is not saved, a prompt indicating that the new member joins the group that is displayed on the mobile phone of the group member is: X invites Y1 to join the group chat. In this case, X is a nickname of the inviter.

Manner 4: When a mobile phone address book of a group member stores both a mobile phone number of an inviter and a remark X1 and stores a mobile phone number of an invitee and a remark Y1, a prompt indicating that the new member joins the group that is displayed on the mobile phone of the group member is: X1 invites Y1 to join the group chat.

Manner 2 to Manner 4 are different from Manner 1. In Manner 1, whether the phone numbers of the inviter and the invitee exist in a MeeTime address book of the group member does not need to be considered, and the nickname of the inviter and/or the nickname of the invitee are/is displayed by default in the prompt indicating that the new member joins the group. In Manner 2 to Manner 4, a case in which the phone numbers of the inviter and the invitee may exist in a MeeTime address book of the group member is considered. For example, for a group member that stores the mobile phone number of the inviter, a remark name of the inviter is displayed in a prompt indicating that the new member joins the group on a mobile phone of the group member; for a group member that does not store the mobile phone number of the inviter, a nickname is displayed on the mobile phone of the group member.

For the foregoing Manner 2 to Manner 4, an implementation is: before the MeeTime cloud service sends a new member joining prompt to the group member, the MeeTime cloud service may determine a group member storing the mobile phone number of the inviter and/or the mobile phone number of the invitee in the MeeTime address book. Because the MeeTime cloud service knows a MeeTime address book of each group member, and also knows a mobile phone number of the inviter and/or a mobile phone number of the invitee, the MeeTime cloud service may determine which group member's MeeTime address book includes the mobile phone number of the inviter and/or the mobile phone number of the invitee.

For a group member that includes the invitee and/or the inviter in the MeeTime address book, the MeeTime cloud server uses one of the foregoing Manner 2 to Manner 4. For example, when the MeeTime cloud service determines that a MeeTime address book of a group member includes the mobile phone numbers of the inviter and the invitee, the MeeTime cloud service may generate a new member joining prompt in the foregoing Manner 4 and send the generated new member joining prompt to the group member. For a group member whose MeeTime address book does not store mobile phone numbers of the inviter and the invitee, the MeeTime cloud server generates a new member joining prompt by using the foregoing Manner 1.

The foregoing embodiment uses an example in which the display style of the new member joining prompt is: "X" invites "Y" to join the group chat. Optionally, the display style of the new member joining prompt may also be "Y joins the group chat", that is, the inviter is not included, and only the invitee is included. There are a plurality of display manners. The principle is the same as that of the foregoing Manner 1 to Manner 4, and details are not described again.

In the foregoing embodiment, it is assumed that the new member joining prompt does not directly expose the mobile phone numbers of the inviter and the invitee. It should be noted that, in addition to that the new member joining prompt does not expose the mobile phone numbers of the inviter and the invitee, when a group member in the group wants to view information about another group member, if the another group member is not in a mobile phone address book of the group member, a mobile phone number of the another group member cannot be viewed.

For example, the group shown in FIG. 5D is used as an example. When the mobile phone detects that the user taps the "More" control in the group chat interface, an interface shown in FIG. 5E may be displayed, where the interface includes related information of the group, for example, includes group members. The group members include Amy (the first user), David (the second user), and flower (the third user). For the first user, the third user is a stranger. Therefore, only the nickname (flower) of the third user can be seen on the mobile phone of the first user, and the mobile phone number of the third user cannot be directly seen.

Figure 5E:
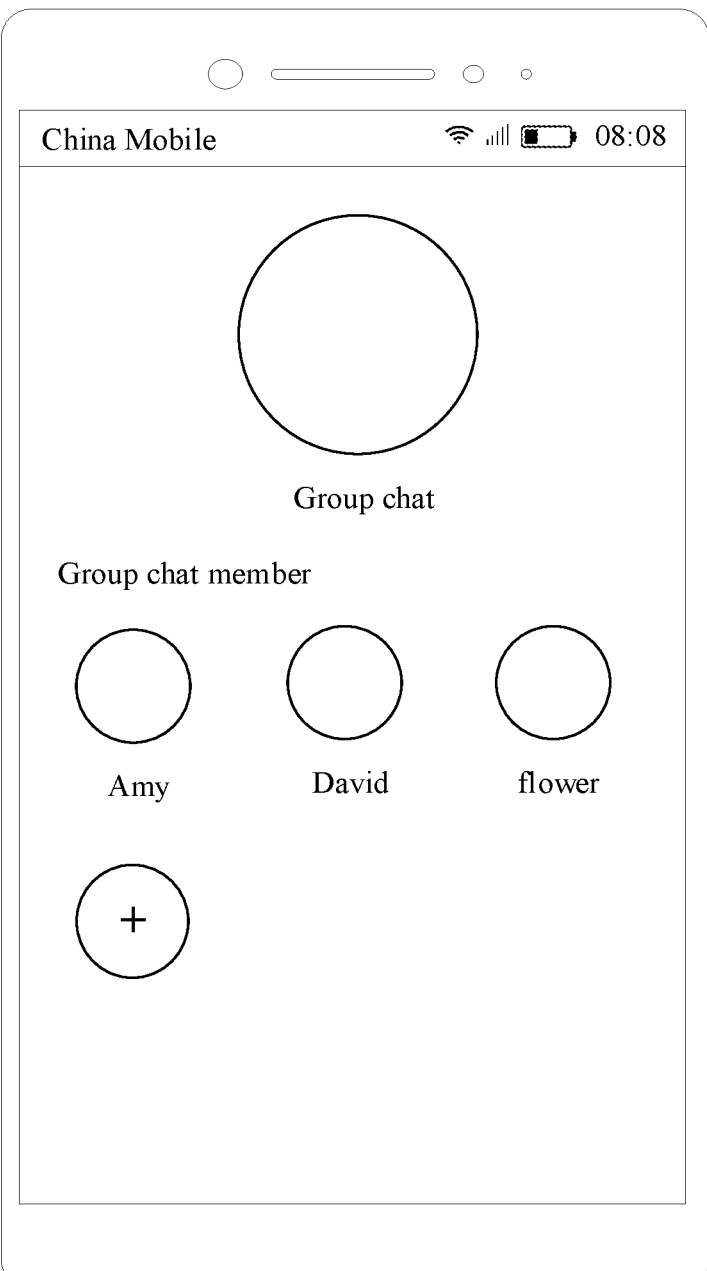
FIG. 5E is a schematic diagram of a GUI of a group member list in a group according to an embodiment of this application.

It can be known by comparing FIG. 5E with (b) in FIG. 2C that, in the current second-type instant messaging application, a mobile phone number of a group member is displayed in plaintext. However, in Embodiment 2, for a group member that is not included in a mobile phone address book, a mobile phone number of the group member cannot be viewed, and security is high.

Embodiment 3

Embodiment 3 describes an implementation process of chatting between two group members in a group. It should be noted that, a mobile phone number of a group member in a group of a current second-type instant messaging application is displayed in plaintext. Therefore, when a group member wants to talk with another group member, the another group member does not need to be added to a mobile phone address book, because the mobile phone number of the another group member is already known, and the group member can directly contact the mobile phone number.

In Embodiment 3, when group member A in a group wants to chat with group member A (audio/video or sending a message), if a mobile phone number of group member B is already in a mobile phone address book of group member A, group member B does not need to be added as a contact, and group member A can chat with group member B directly. If the mobile phone number of group member B is not in the mobile address book of group member A, group member A does not know the mobile phone number of group member B. Therefore, group member A can send a request to group member B for adding a contact. The mobile phone number of group member B can be obtained only after group member B agrees, and then the mobile phone number of group member B is added to the mobile address book. Then, group member A can chat with group member B.

Figure 6A:
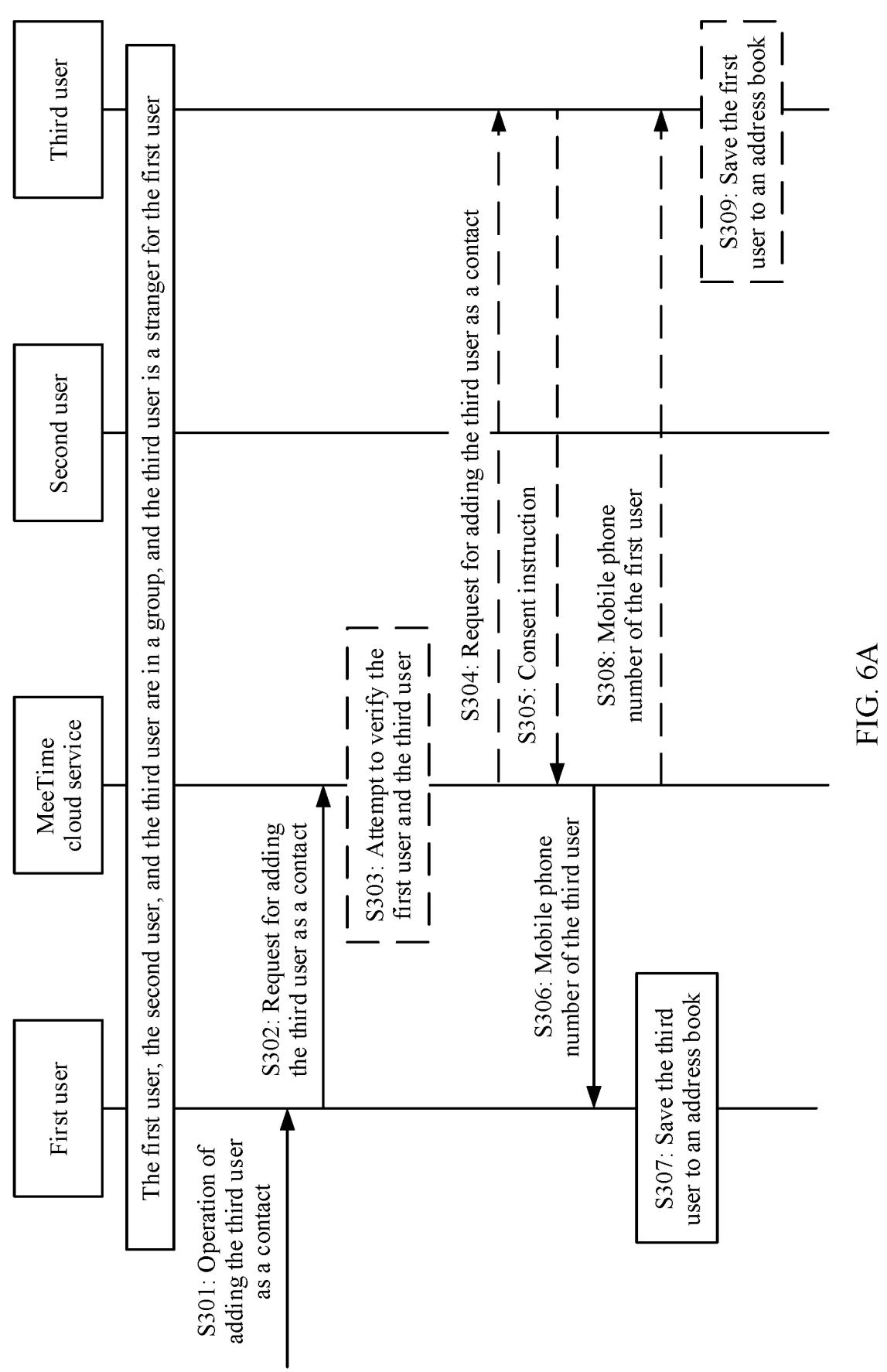
FIG. 6A is a schematic diagram of a procedure in which a group member in a group adds another group member as a contact according to an embodiment of this application.
Figure 6B:
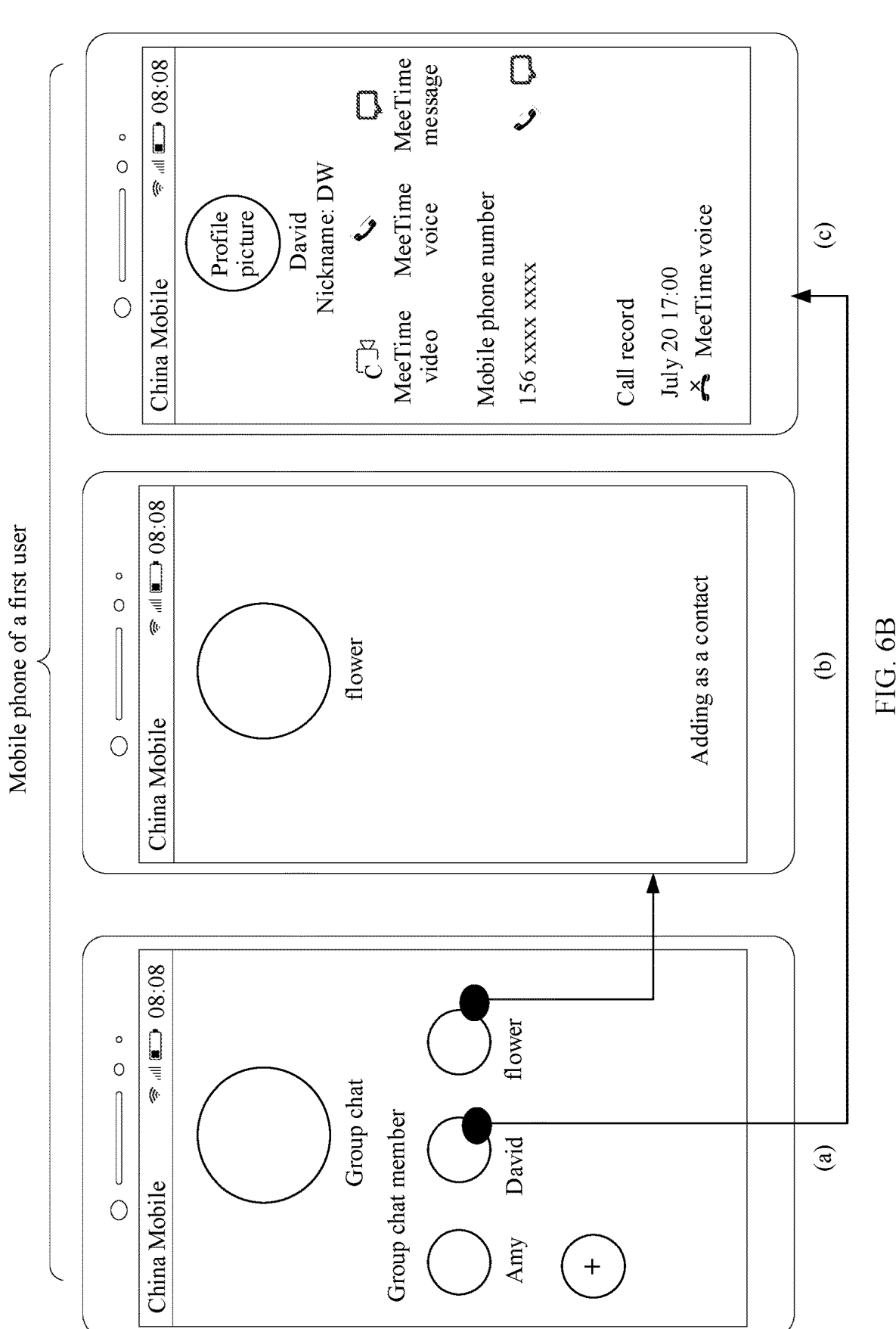
FIG. 6B and FIG. 6C are schematic diagrams of GUIs displayed when a group member in a group adds another group member as a contact according to an embodiment of this application.
Figure 6C:
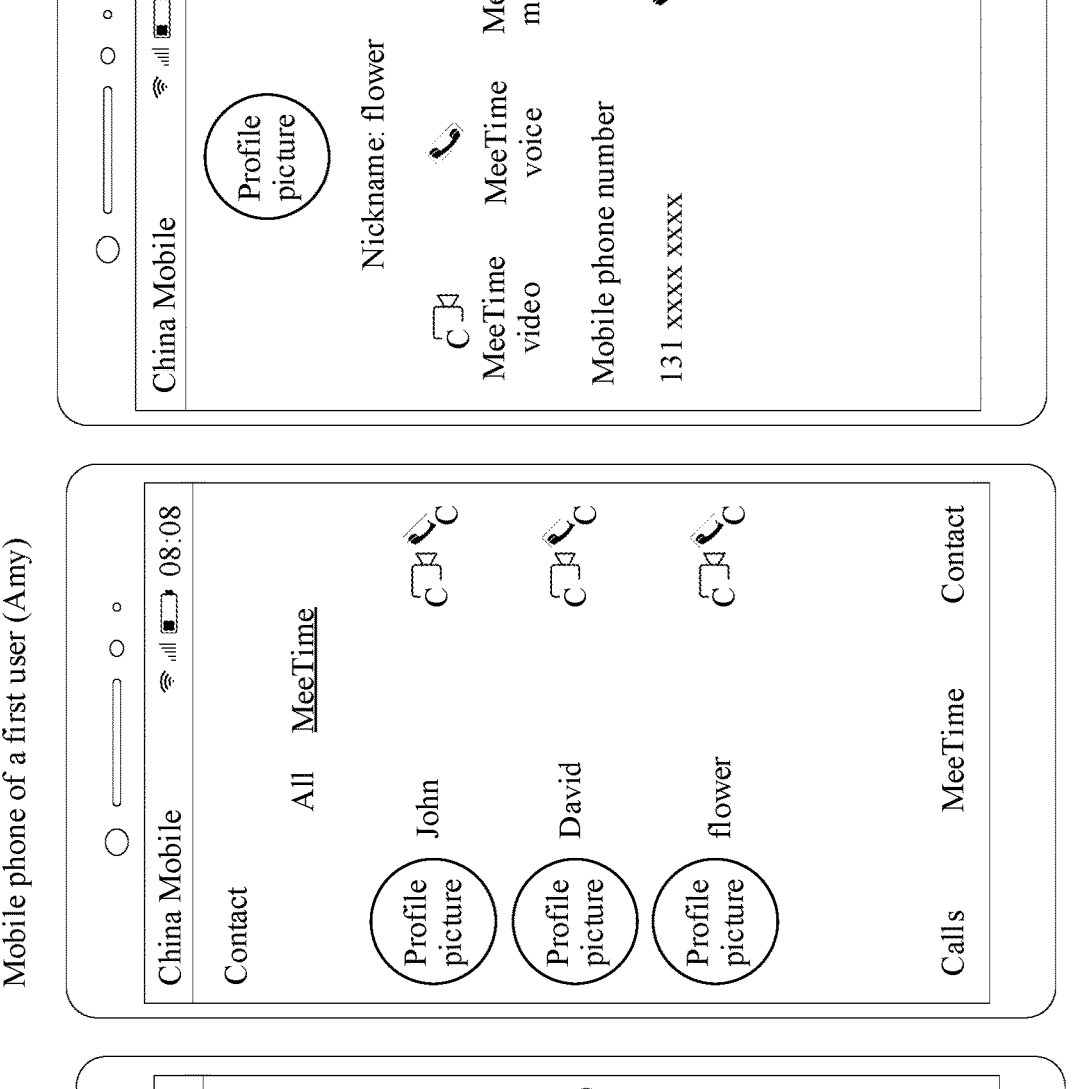

Accompanying drawings involved in Embodiment 3 include FIG. 6A to FIG. 6C.

FIG. 6A is a schematic flowchart of adding a stranger in a group as a contact. The process may be understood as a process after a group including a first user (Amy), a second user (David), and a third user (nickname: flower) is established, where the third user does not exist in a mobile phone address book of the first user. Specifically, the process includes the following steps.

S301: A mobile phone of the first user detects an operation of adding the third user as a contact.

For example, (a) in FIG. 6B is a schematic diagram of a GUI on the mobile phone of the first user. If the first user wants to chat with the third user whose nickname is "flower" alone, the first user may add the third user as a contact, and then chat with the third user alone. For example, when the mobile phone of the first user detects a tap operation on a profile picture of the third user, an interface shown in (b) in FIG. 6B is displayed, where the interface includes the nickname flower and the profile picture of the third user, and a control for adding a contact. Therefore, the operation used to add the third user as a contact in S301 may be an operation of tapping, by the user, the control for adding a contact, or may be another operation, for example, a voice instruction used to add the third user as a contact. This is not limited in this embodiment of this application.

It should be noted that FIG. 6B is still used as an example. For the first user, the third user is a stranger. Therefore, when detecting an operation of tapping the profile picture of the third user by the user, the mobile phone displays an interface shown in (b) in FIG. 6B. To prevent exposure of a mobile phone number of the third user, the interface displays only the nickname "flower" and the profile picture of the third user, and does not display the mobile phone number of the third user. For ease of comparison, (a) in FIG. 6B is still used as an example. If the mobile phone detects an operation of tapping a profile picture of the second user (David) by the user, an interface shown in (c) in FIG. 6B is displayed. Because David exists in a MeeTime address book of the first user, the interface includes a mobile phone number, the profile picture, a nickname, and the like of David. Optionally, a call record with David may be further displayed in the interface, and the first user may directly perform a call with David.

It can be learned, by comparing (b) in FIG. 6B with (c) in FIG. 6B, that when a group member views information about another group member in a group, if the viewed group member is a stranger (for example, the third user), the interface shown in (b) in FIG. 6B is displayed, where the interface does not include a mobile phone number of the other party, and only displays a nickname and/or a profile picture of the other party. If the viewed group member is not a stranger (for example, David), the interface shown in (c) in FIG. 6B is displayed, where the interface includes a mobile phone number of the group member, and a chat may be performed with the other party alone based on the interface.

S302: The first user sends a request for adding the third user as a contact to a MeeTime cloud service. The request includes a number of the first user, and the profile picture and/or the nickname of the third user.

S303: The MeeTime cloud service attempts to verify the first user and the third user. S303 may be performed or may not be performed.

For example, the MeeTime cloud service may attempt to verify whether the first user and the third user are valid users (whether the first user and the third user have registered with MeeTime). If yes, the verification is successful, and subsequent steps continue to be performed; otherwise, the verification fails.

S304: The MeeTime cloud service sends a request for adding the third user as a contact to the third user. The request may carry a nickname and a profile picture of the first user, and optionally, may further carry the mobile phone number of the first user.

S305: The third user sends a consent instruction to the MeeTime cloud service.

Optionally, S304 and S305 are optional steps, and may be performed or may not be performed. Therefore, S304 and S305 in FIG. 6A are represented by dashed lines. If the operation is not performed, that is, without consent of the third user, the MeeTime cloud service may directly perform S306.

S306: The MeeTime cloud service sends the mobile phone number of the third user to the first user.

S307: The first user saves the mobile phone number of the third user in the address book.

In the foregoing embodiment, that the mobile phone of the first user in (b) in FIG. 6B directly sends a request for adding the third user as a contact to the MeeTime cloud service when detecting an operation on a contact adding control is used as an example. It may be understood that, when an operation on the contact adding control is detected in (b) in FIG. 6B, the request for adding the third user as a contact may not be sent to the MeeTime cloud service first. For example, when the mobile phone of the first user in (b) in FIG. 6B detects a tap operation on the contact adding control, an interface shown in (a) in FIG. 6C may be displayed, where the interface includes verification information, for example, hello, I am "xxx" in the group chat. Herein, "xxx" may be a nickname of the first user. When detecting an operation on the "Send" control, the mobile phone sends a request for adding the third user as a contact to the MeeTime cloud service, where the request may carry the verification information. The request may further carry the nickname, the profile picture, and the like of the third user. Optionally, still refer to (a) in FIG. 6C. The first user may enter a name in a contact name input box, and after the other party agrees to the request for adding a contact, a mobile phone number of the other party is stored in the mobile phone address book of the first user, and a remark name of the mobile phone number is the name entered in the input box.

When receiving the mobile phone number of the third user, the mobile phone of the first user saves the mobile phone number of the third user. For example, as shown in (b) in FIG. 6C, the mobile phone address book of the first user includes the third user. In this case, if the user wants to chat with the third user alone, the user may tap the profile picture or the nickname of the third user, open an interface shown in (c) in FIG. 6C, and initiate a separate chat by using a MeeTime call mark, a MeeTime voice mark, or a MeeTime message mark in the interface. Certainly, a chat may be directly initiated by using a MeeTime call mark or a MeeTime voice mark in the interface shown in (b) in FIG. 6C.

The foregoing process describes a process in which the first user requests to add the third user as a contact. Optionally, after the first user adds the third user as a contact, the third user may add the first user as a contact by default, for example, by using the following steps S308 and S309.

S308: The MeeTime cloud service sends the mobile phone number of the first user to the third user.

S309: The third user saves the mobile phone number of the first user in an address book.

S308 and S309 are optional steps, and therefore are represented by dashed lines in the figure. Alternatively, before adding the first user as a contact, the third user may further send a request for adding a contact to the first user, and if the first user agrees, S308 and S309 are performed.

Embodiment 4

In Embodiment 3, when group member A in the group wants to chat with group member A alone, if group member B is not in the mobile phone address book of group member A, a request for adding a contact is sent to group member B. Only when the other party agrees, the mobile phone number of group member B can be obtained, group member B is added to the mobile phone address book, and then group member A can chat with group member B alone. In consideration of a scenario in which group member A previously chatted with group member B alone, for example, group member A has dialed the phone number of group member B, but group member A does not save the phone number in the mobile phone address book, and group member B is identified as a stranger of group member A, in this case, because a historical call record of group member A already includes the mobile phone number of group member B, a contact adding request may not be sent to group member B.

Therefore, a difference between Embodiment 4 and Embodiment 3 lies in that: in Embodiment 4, before sending the request for adding a contact to group member B, group member A may further determine whether group member B exists in the historical call record of group member A. If yes, group member A may directly store the mobile phone number of group member B in the historical call record to the mobile phone address book without sending the contact adding request to group member B; or if no, group member A sends the contact adding request to group member B.

Figure 7A:
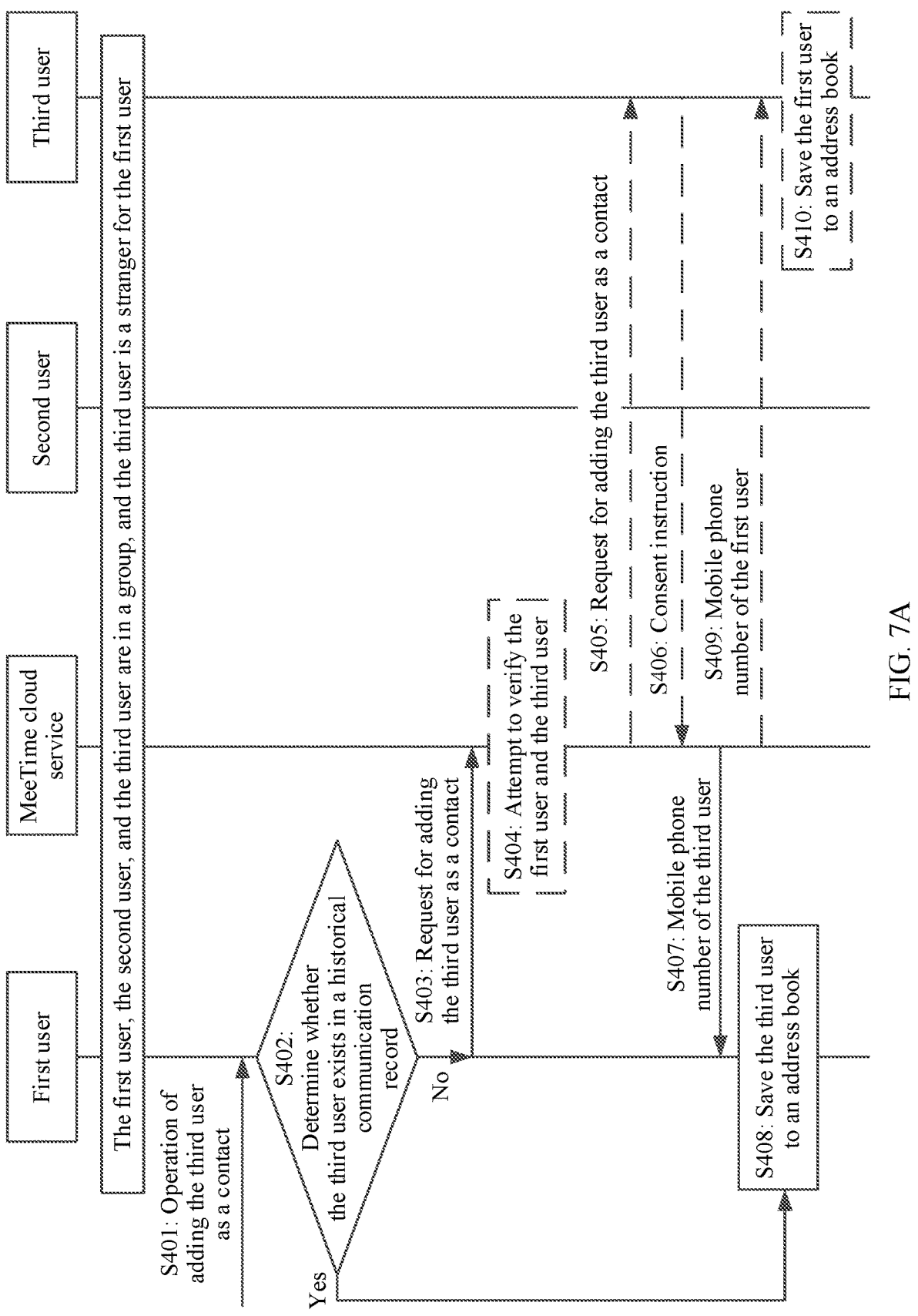
FIG. 7A is a schematic diagram of another procedure in which a group member in a group adds another group member as a contact according to an embodiment of this application.

FIG. 7A is a schematic flowchart of adding a stranger in a group as a contact. The process may be understood as a process after a group including a first user (Amy), a second user (David), and a third user (nickname: flower) is established, where the third user does not exist in a mobile phone address book of the first user. Specifically, the process includes the following steps.

S401: A mobile phone of the first user detects an operation of adding the third user as a contact.

For an implementation principle of S401, refer to the implementation principle of S301 in Embodiment 3, and details are not described herein again. For example, the operation may be an operation of tapping a control "Adding as a contact" in (b) in FIG. 6B.

S402: The mobile phone of the first user determines whether a mobile phone number of the third user exists in a historical call record; and if yes, may directly perform S408; otherwise, performs S403.

The historical call record may be a recent call record, for example, a recent call record shown in FIG. 4A(d). Alternatively, the historical call record may be a historical SMS message record shown in FIG. 4A(c). This is not limited in this application.

The mobile phone of the first user may locally determine whether the third user exists in the historical call record. For example, the local historical call record includes a profile picture and a nickname of the user, and it may be determined, by comparing the profile picture and the nickname, whether the profile picture and the nickname of the third user exist in the historical call record. If the profile picture and the nickname exist, it is determined that the third user exists in the historical call record; otherwise, it is determined that the third user does not exist in the historical call record.

Figure 7B:
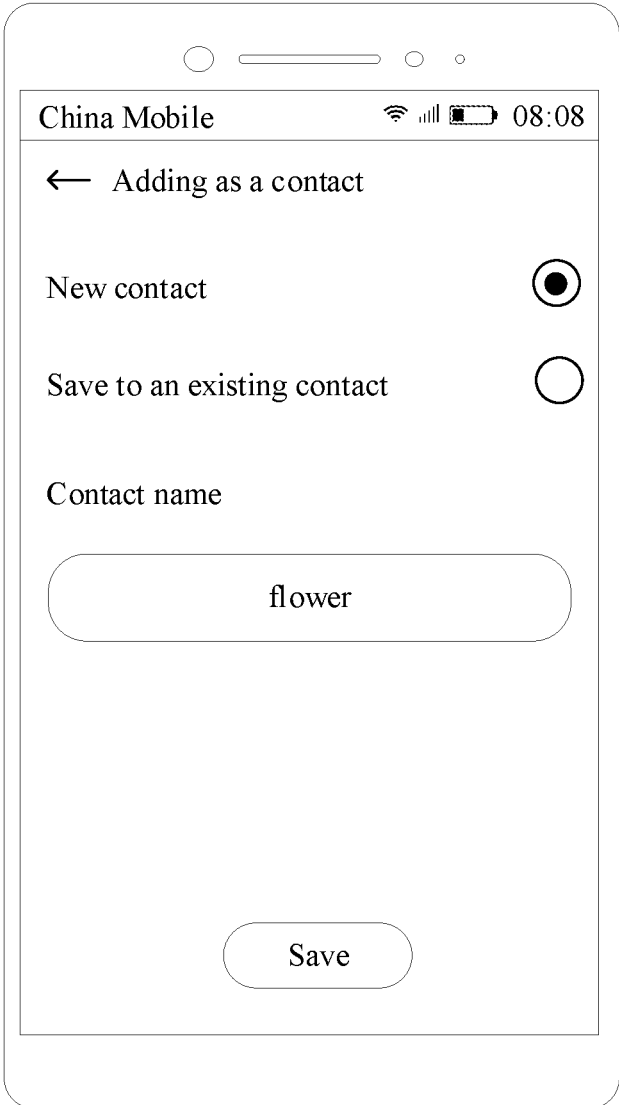
FIG. 7B is a schematic diagram of a GUI for saving a contact according to an embodiment of this application.

When the mobile phone of the first user determines that the mobile phone number of the third user exists in the historical call record, S408 may be directly performed. (b) in FIG. 6B is used as an example. In response to an operation of tapping the contact adding control by the user, the mobile phone of the first user determines whether the third user exists in the historical call record of the first user. If the third user exists in the historical call record of the first user, the third user is directly stored in the address book, that is, S408 is directly performed. Alternatively, when the mobile phone of the first user determines that the mobile phone number of the third user exists in the historical call record, prompt information pops up to prompt whether to save the mobile phone number as a contact. If a confirmation indication is received, S408 is performed. For example, (b) in FIG. 6B is still used as an example. In response to the operation of tapping the contact adding control by the user, the mobile phone of the first user does not directly save the third user to the address book, but displays an interface shown in FIG. 7B. The interface includes a Save button. When detecting an operation on the Save button, the mobile phone adds the third user as a contact.

When the mobile phone number of the third user does not exist in the historical call record of the first user, S403 may be directly performed. For example, (b) in FIG. 6B is used as an example. In response to an operation of tapping the contact adding control by the user, the mobile phone of the first user determines whether the third user exists in the historical call record of the first user, and if no, sends a request for adding the third user as a contact to the MeeTime cloud service, that is, directly performs S403. Alternatively, when it is determined that the mobile phone number of the third user does not exist in the historical call record of the first user, prompt information is displayed to prompt the user whether to send a contact adding request to the other party, and if a confirmation instruction is detected, the contact adding request is sent to the MeeTime cloud service, that is, S403 is performed. For example, (b) in FIG. 6B is still used as an example. In response to an operation of tapping the contact adding control by the user, the mobile phone of the first user determines whether the third user exists in the historical call record of the first user. If the third user does not exist in the historical call record of the first user, an interface shown in (a) in FIG. 6C is displayed. When an operation on the "Send" control is detected, S403 is performed.

S403: The first user sends a request for adding the third user as a contact to a MeeTime cloud service.

S404: The MeeTime cloud service attempts to verify the first user and the third user.

S405: The MeeTime cloud service sends a request for adding the third user as a contact to the third user.

S406: The third user sends a consent instruction to the MeeTime cloud service.

S407: The MeeTime cloud service sends the mobile phone number of the third user to the first user.

S408: The first user saves the third user in an address book.

S409: The MeeTime cloud service sends the mobile phone number of the first user to the third user.

S410: The third user saves the first user in an address book.

Implementation principles of S403 to S410 are the same as implementation principles of S303 to S310 in Embodiment 3, and details are not described again.

It should be noted that, in the foregoing embodiment, an example in which the mobile phone of the first user locally determines whether the third user exists in the historical call record is used. Optionally, whether the third user exists in the historical communication record of the first user may be further determined by using the MeeTime cloud service. For example, because the first user knows only the nickname and the profile picture of the third user, but does not know the mobile phone number of the third user, the mobile phone of the first user may send a query request to the MeeTime cloud service, where the query request is used for requesting to query whether the third user exists in the historical call record of the first user. For example, the query request includes the historical call record of the first user, and further includes the nickname and/or the profile picture of the third user. Because the MeeTime cloud service knows the mobile phone number of the third user, the MeeTime cloud service may determine whether the mobile phone number of the third user exists in the historical call record, and feed back indication information to the mobile phone. It is assumed that, after the MeeTime cloud service determines that a phone number, for example, 131 xxxx xxxx, in the historical call record is the mobile phone number of the third user, the MeeTime cloud server sends first prompt information to the first user, where the first prompt information indicates that the phone number 131 xxxx xxxx in the historical call record is the mobile phone number of the third user. If it is determined, by using the MeeTime cloud service, that the mobile phone number of the third user does not exist in the historical call record, second prompt information that does not include the third user may be sent to the first user.

In summary, in Embodiment 4, in the case in which the mobile phone number of group member B exists in the historical call record of group member A, the contact adding request does not need to be sent to group member B; otherwise, the contact adding request needs to be sent to group member B.

Embodiment 5

In Embodiment 4, it is determined whether the mobile phone number of group member B exists in the historical call record of group member A, and whether to send the contact adding request to group member B is determined based on a determining result. Embodiment 5 describes another manner. When group member A wants to chat with group member B alone, group member A may determine whether a mobile phone number of group member A exists in a mobile phone address book of the other party (that is, group member B) through a MeeTime cloud service. If yes, a mobile phone number of the other party is obtained from the MeeTime cloud service and stored in the mobile phone address book, and a contact adding request does not need to be sent to the other party; otherwise, a contact adding request needs to be sent to the other party.

Figure 8:
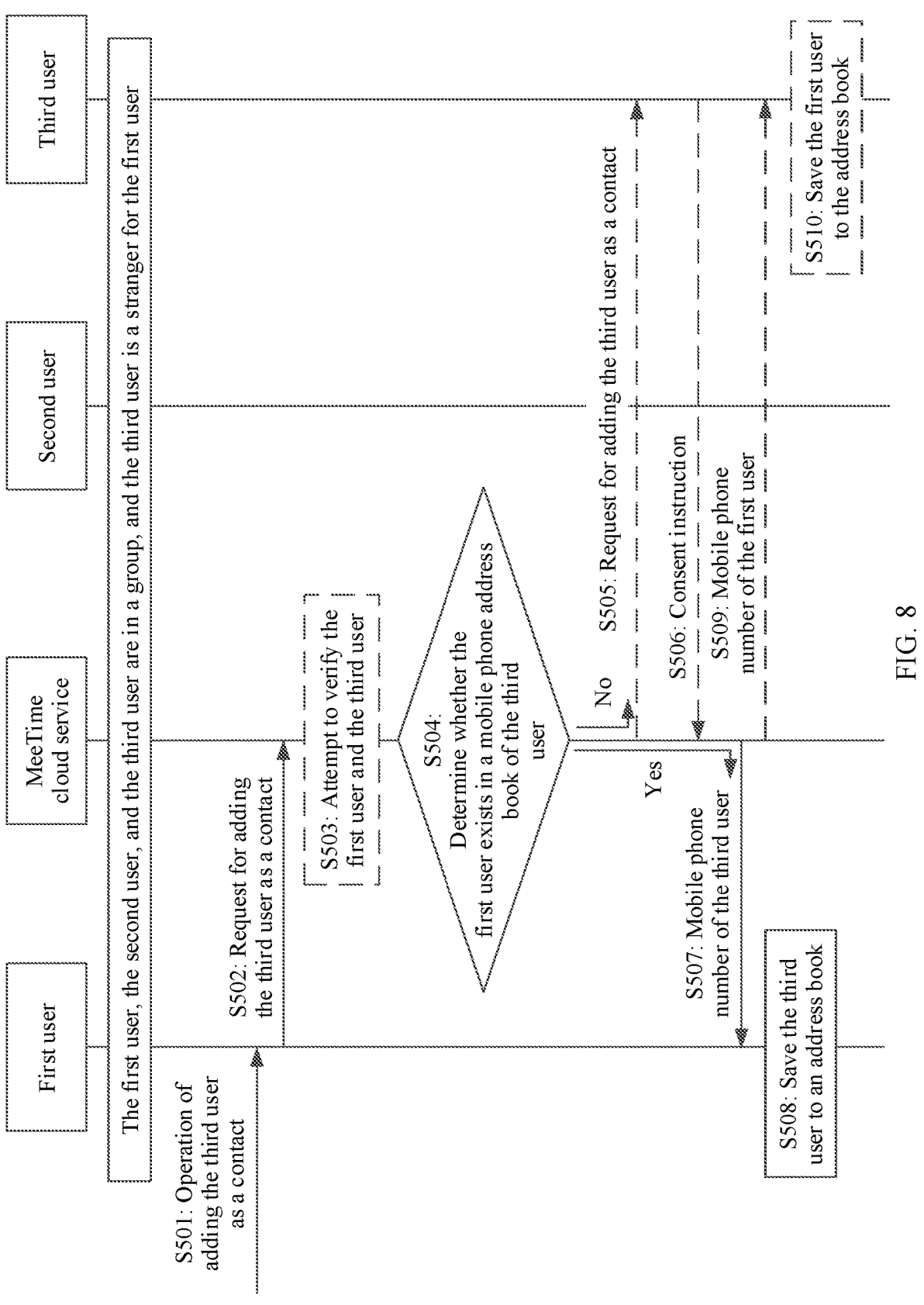
FIG. 8 is a schematic diagram of still another procedure in which a group member in a group adds another group member as a contact according to an embodiment of this application.

FIG. 8 is a schematic flowchart of adding a stranger in a group as a contact. The process may be understood as a process after a group including a first user (Amy), a second user (David), and a third user (nickname: flower) is established, where the third user does not exist in a mobile phone address book of the first user. Specifically, the process includes the following steps.

S501: A mobile phone of the first user detects an operation of adding the third user as a contact.

For an implementation principle of S501, refer to the implementation principle of S301 in Embodiment 3, and details are not described herein again. For example, the operation may be an operation of tapping a control "Adding as a contact" in (b) in FIG. 6B.

S502: The mobile phone of the first user sends a request for adding the third user as a contact to a MeeTime cloud service. The request carries a mobile phone number of the first user, and a nickname and/or a nickname of the third user.

S503: The MeeTime cloud service attempts to verify the first user and the third user. S503 may be performed or may not be performed.

S504: The MeeTime cloud service queries whether the first user exists in a mobile phone address book of the third user. If yes, directly go to S507; otherwise, perform S505.

Because the MeeTime cloud service stores a mobile phone address book of each registered user, the MeeTime cloud service may know the mobile phone address book of the third user. In addition, the MeeTime cloud service also knows the mobile phone number of the first user. Therefore, the MeeTime cloud service may determine whether the mobile phone number of the first user exists in the mobile phone address book of the third user.

When the MeeTime cloud service queries that the first user exists in the mobile phone address book of the third user, S507 may be directly performed, that is, the mobile phone number of the third user is sent to the first user. When receiving the mobile phone number of the third user, the mobile phone of the first user may directly store the mobile phone number in an address book, or may first pop up an interface shown in FIG. 7B, and when an operation of tapping a "Save" control is detected, the third user is saved in the address book.

When the MeeTime cloud service finds that the first user does not exist in the mobile phone address book of the third user, S505 may be directly performed. Alternatively, when the MeeTime cloud service finds that the first user does not exist in the mobile phone address book of the third user, the MeeTime cloud service may first send indication information to the first user, to indicate that the first user does not exist in the mobile phone address book of the third user. In this case, the mobile phone of the first user may display an interface shown in (a) in FIG. 6C. When an operation on the "Send" control is detected, a confirmation instruction is sent to the MeeTime cloud service, to indicate to confirm to send a contact adding request to the third user. When the Mee-Time cloud service receives the confirmation instruction, S505 is performed.

S505: The MeeTime cloud service sends a request for adding the third user as a contact to the third user.

S506: The third user sends a consent instruction to the MeeTime cloud service.

S507: The MeeTime cloud service sends the mobile phone number of the third user to the first user.

S508: The first user saves the third user in an address book.

S509: The MeeTime cloud service sends the mobile phone number of the first user to the third user.

S510: The third user saves the first user in an address book.

Implementation principles of S503 and S505 to S510 are the same as implementation principles of S303 to S310 in Embodiment 3, and details are not repeated.

Optionally, if the manner of determining whether a contact adding request needs to be sent to the other party provided in Embodiment 4 is used as a first manner, and the manner of determining whether a contact adding request needs to be sent to the other party provided in Embodiment 5 is used as a second manner. The first manner or the second manner may be used by default. Alternatively, the first manner and the second manner may be used in combination. For example, the first manner is first used. When the first manner is used to determine that the third user does not exist in the historical call record of the first user, the second manner is used to determine whether the first user exists in the mobile phone address book of the third user, and determine, based on a determining result, whether to send the contact adding request to the other party.

Figure 9:
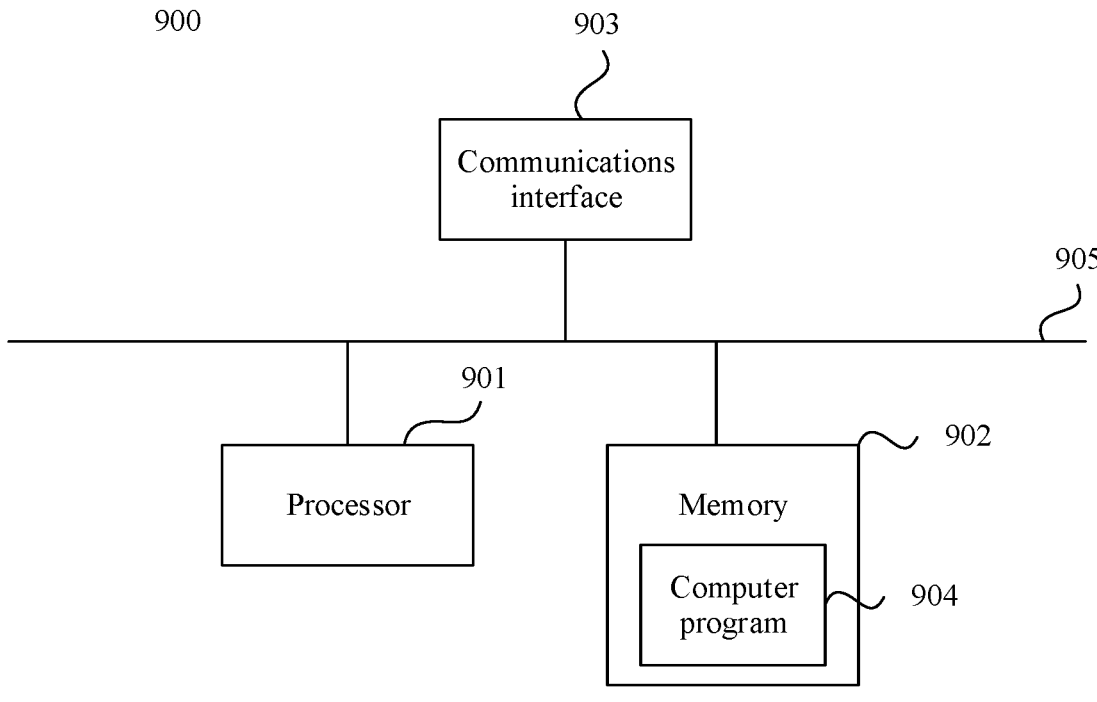
FIG. 9 is a schematic diagram of a structure of a terminal device or a cloud server according to an embodiment of this application.

Based on a same conception, FIG. 9 shows a cloud server 900 according to this application. The cloud server 900 may be the foregoing MeeTime cloud service. As shown in FIG. 9, some other embodiments of this application disclose a cloud server 900. The cloud server 900 may include one or more processors 901, one or more memories 902, a communications interface 903, and one or more computer programs 904. The foregoing components may be connected by using one or more communications buses 905. The one or more computer programs 904 are stored in the memory 902 and are configured to be executed by the one or more processors 901. The one or more computer programs 904 include instructions, and the instructions may be used to perform steps related to the MeeTime cloud service in the foregoing corresponding embodiment. The communications interface 903 is configured to implement communication with another device (for example, a terminal device). For example, the communications interface may be a transceiver.

In the foregoing embodiments provided in this application, the method provided in the embodiments of this application is described from a perspective in which the electronic device (for example, the terminal device or the MeeTime cloud server) serves as an execution body. To implement the functions in the method provided in the foregoing embodiments of this application, the electronic device may include a hardware structure and/or a software module, to implement the functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

According to context, the term "when . . . " or "after . . . " used in the foregoing embodiments may be interpreted as a meaning of "if . . . ", "after . . . ", "in response to determining . . . ", or "in response to detecting . . . ". Similarly, according to the context, the phrase "when it is determined that . . . " or "if (a stated condition or event) is detected" may be interpreted as a meaning of "if it is determined that . . . ", "in response to determining . . . ", "when (a stated condition or event) is detected", or "in response to detecting (a stated condition or event)". In addition, in the foregoing embodiments, relationship terms such as first and second are used to distinguish one entity from another entity, but do not limit any actual relationship and sequence between these entities.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, DVD), a semiconductor medium (for example, a solid state disk Solid State Disk (SSD)), or the like. In a case in which no conflict occurs, the solutions in the foregoing embodiments may be combined for use.

It should be noted that a part of this patent application document includes copyright-protected content. The copyright owner reserves the copyright except copies are made for the patent documents or the recorded content of the patent documents in the Patent Office.

What is claimed is:

1. A method for protecting privacy of a group member in a group, the method comprising:
displaying, by a terminal device, a group member list of a group in an instant messaging application, wherein the group member list comprises a first group member and a second group member;
displaying, by the terminal device in response to a first operation used for selecting the first group member, a first phone number of the first group member, wherein the first phone number is a phone number of the first group member that is saved in an address book of the terminal device;
displaying, by the terminal device in response to a second operation used for selecting the second group member, a profile picture or a user name of the second group member, and a control for adding a contact;
determining, by the terminal device in response to a third operation for the control, that a second phone number of the second group member does not exist in a historical communication record of the terminal device;
sending, by the terminal device, a first request to a cloud server in response to the determining that the second phone number of the second group member does not exist in the historical communication record of the terminal device, wherein the first request is configured to cause the cloud server to verify that it is authorized to send the second phone number of the second group member to the terminal device;
receiving, by the terminal device from the cloud server, the second phone number of the second group member to the terminal device in response to the first request; and
saving, by the terminal device, the second group member as a contact based on the second phone number.

2. The method according to claim 1, wherein the receiving, by the terminal device from the cloud server, the second phone number of the second group member to the terminal device in response to the first request comprises:
sending, by the cloud server, a second request to the second group member in response to the first request, wherein the second request is used for indicating that the terminal device requests to add the second group member as a contact; and
sending, by the cloud server, the second phone number of the second group member to the terminal device when receiving a consent instruction from the second group member.

3. The method according to claim 1, wherein the determining, by the terminal device, that the phone number of the second group member does not exist in the historical communication record of the terminal device comprises:
searching, by the terminal device, profile pictures corresponding to all numbers in a historical communication record for a profile picture that matches the profile picture of the second group member, or searching, by the terminal device, user names corresponding to all the numbers in the historical communication record for a user name that matches the user name of the second group member; and when no profile picture that matches the profile picture of the second group member is found in the historical communication record, or no user name that matches a user name of the second group member is found, determining that the phone number of the second group member is not in the historical communication record.

4. The method according to claim 1, wherein the sending, by the terminal device, the first request to the cloud server in response to the third operation for the control comprises:

sending, by the terminal device, a historical communication record of the terminal device to the cloud server;

sending, by the terminal device, a third request to the cloud server, wherein the third request requests to determine whether the second phone number of the second group member exists in the historical communication record;

receiving, by the terminal device from the cloud server a determining result indicating whether the second phone number of the second group member exists in the historical communication record.

5. The method according to claim 1, wherein the historical communication record comprises a recent call record or a historical SMS message record.

6. The method according to claim 1, wherein the cloud server stores an address book of the second group member, and the method further comprises:

in response to the first request, determining, by the cloud server, that a phone number of the terminal device exists in the address book of the second group member; and in response to the cloud server determining that the phone number of the terminal device exists in the address book of the second group member, sending the second phone number of the second group member to the terminal device.

7. The method according to claim 1, wherein the cloud server stores an address book of the second group member, and the method further comprises:

in response to the first request, determining, by the cloud server, that a phone number of the terminal device does not exist in the address book of the second group member; and in response to the cloud server determining that the phone number of the terminal device does not exist in the address book of the second group member, sending, by the cloud server, the second request to the second group member, wherein the second request is used for indicating that the terminal device requests to add the second group member as a contact; and sending, by the cloud server, the second phone number of the second group member to the terminal device when receiving the consent instruction from the second group member.

8. The method according to claim 1, wherein before the displaying, by the terminal device, the group member list of the group in the instant messaging application, the method further comprises:

displaying, by the terminal device, first group joining information, wherein the first group joining information indicates that the first group member is invited to join a group chat, and information about the first group member that is displayed in the first group joining information is a local name that is of the first group member and that is in the address book of the terminal device; and displaying, by the terminal device, second group joining information, wherein the second group joining information indicates that the second group member is invited to join the group chat, and information about the second group member that is displayed in the second group joining message is the user name of the second group member.

9. The method according to claim 8, wherein an inviter for inviting the first group member to join the group is a first inviter; and when the first inviter exists in the address book of the terminal device, the first group joining information comprises a local name that is of the first inviter and that is in the address book; or when the first inviter does not exist in the address book of the terminal device, the first group joining information comprises a user name of the first inviter; and an inviter for inviting the second group member to join the group is a second inviter; and when the second inviter exists in the address book of the terminal device, the second group joining message comprises a local name that is of the second inviter and that is in the address book; or when the second inviter does not exist in the address book of the terminal device, the second group joining message comprises a user name of the second inviter.

10. The method according to claim 1, wherein the sending, by the terminal device, the first request to the cloud server in response to the third operation for the control comprises:

displaying, by the terminal device, a first interface in response to the third operation, wherein the first interface comprises a verification information input box;

receiving, by the terminal device, an input operation, wherein the input operation is used for entering verification information in the verification information input box, and the verification information is used for describing user identity information of the terminal device; and ending, by the terminal device, the first request to the server in response to a fourth operation used for sending the verification information, wherein the first request carries the verification information.

11. A method for protecting privacy of a group member in a group, comprising:

displaying, by a terminal device, a group member list of a group in an instant messaging application, wherein the group member list comprises a first group member and a second group member;

displaying, by the terminal device in response to a first operation used for selecting the first group member, a first phone number of the first group member, wherein the first phone number is a phone number of the first group member that is saved in an address book of the terminal device;

displaying, by the terminal device in response to a second operation used for selecting the second group member, a profile picture or a user name of the second group member, and a control for adding a contact;

determining, by the terminal device in response to a third operation for the control, that a second phone number of the second group member does not exist in a historical communication record of the terminal device;

sending, by the terminal device, a first request to a cloud server in response to a third operation for the control, when the second phone number of the second group member does not exist in the historical communication record of the terminal device, wherein the first request is configured to cause the cloud server to verify that it is authorized to send the second phone number of the second group member to the terminal device;

receiving, by the terminal device, the second phone number of the second group member from the cloud server;

saving, by the terminal device, the second group member as a contact based on the second phone number; and displaying, by the terminal device, the second phone number of the second group member in the instant messaging application.

12. The method according to claim 11, wherein the sending, by the terminal device, the first request to the cloud server in response to the third operation for the control comprises:

determining, by the terminal device in response to the third operation, that the phone number of the second group member does not exist in the historical communication record of the terminal device; and sending, by the terminal device, the first request to the cloud server in response to determining that the phone number of the second group member does not exist in the historical communication record.

13. The method according to claim 12, wherein the determining, by the terminal device, that the phone number of the second group member does not exist in the historical communication record of the terminal device comprises:

searching, by the terminal device, profile pictures corresponding to all numbers in a historical communication record for a profile picture that matches the profile picture of the second group member, or searching, by the terminal device, user names corresponding to all the numbers in the historical communication record for a user name that matches the user name of the second group member; and when no profile picture that matches the profile picture of the second group member is found in the historical communication record, or no user name that matches the user name of the second group member is found, determining that the phone number of the second group member is not in the historical communication record.

14. The method according to claim 10, wherein the sending, by the terminal device, the first request to the cloud server in response to the third operation for the control comprises:

sending, by the terminal device, a historical communication record of the terminal device to the cloud server;

sending, by the terminal device, a third request to the cloud server, wherein the third request requests to determine whether the phone number of the second group member exists in the historical communication record; and receiving, by the terminal device, a determining result from the cloud server.

15. The method according to claim 12, wherein the historical communication record comprises a recent call record or a historical SMS message record.

16. The method according to claim 11, wherein before the displaying, by the terminal device, the group member list of the group in the instant messaging application, the method further comprises:

displaying, by the terminal device, first group joining information, wherein the first group joining information indicates that the first group member is invited to join a group chat, and information about the first group member that is displayed in the first group joining information is a local name that is of the first group member and that is in the address book of the terminal device; and displaying, by the terminal device, second group joining information, wherein the second group joining information indicates that the second group member is invited to join the group chat, and information about the second group member that is displayed in the second group joining message is the user name of the second group member.

17. The method according to claim 16, wherein an inviter for inviting the first group member to join the group is a first inviter; and when the first inviter exists in the address book of the terminal device, the first group joining information comprises a local name that is of the first inviter and that is in the address book; or when the first inviter does not exist in the address book of the terminal device, the first group joining information comprises a user name of the first inviter; and an inviter for inviting the second group member to join the group is a second inviter; and when the second inviter exists in the address book of the terminal device, the second group joining message comprises a local name that is of the second inviter and that is in the address book; or when the second inviter does not exist in the address book of the terminal device, the second group joining message comprises a user name of the second inviter.

18. The method according to claim 11, wherein the sending, by the terminal device, the first request to the cloud server in response to the third operation for the control comprises:

displaying, by the terminal device, a first interface in response to the third operation, wherein the first interface comprises a verification information input box;

receiving, by the terminal device, an input operation, wherein the input operation is used for entering verification information in the verification information input box, and the verification information is used for describing user identity information of the terminal device; and sending, by the terminal device, the first request to the server in response to a fourth operation used for sending the verification information, wherein the first request carries the verification information.

19. A terminal device, comprising:

at least one processor, at least one memory, and one or more programs, wherein the one or more programs are stored in the memory, the one or more programs comprise instructions, and when the instructions are executed by the processor, the terminal device is enabled to:

display a group member list of a group in an instant messaging application, wherein the group member list comprises a first group member and a second group member;

display, in response to a first operation used for selecting the first group member, a first phone number of the first group member, wherein the first phone number is a phone number of the first group member that is saved in an address book of the terminal device;

display, in response to a second operation used for selecting the second group member, a profile picture or a user name of the second group member, and a control for adding contact;

determine, by the terminal device in response to a third operation for the control, that a second phone number of the second group member does not exist in a historical communication record of the terminal device;

send a first request to a cloud server in response to a third 5 operation for the control, when a second phone number of the second group member does not exist in the historical communication record of the terminal device, wherein the first request is configured to cause the cloud server to verify that it is authorized to send the 10 second phone number of the second group member to the terminal device;

receive the second phone number of the second group member from the cloud server;

save the second group member as a contact based on the 15 second phone number; and display the second phone number of the second group member in the instant messaging application.

\* \* \* \* \*